US012614930B2

(12) United States Patent
Kanakasabai et al.

(10) Patent No.: US 12,614,930 B2
(45) Date of Patent: *Apr. 28, 2026

(54) DYNAMIC CONTROL OF WIRELESS POWER FOR A VARIABLE LOAD

(71) Applicant: GE Intellectual Property Licensing, LLC, Niskayuna, NY (US)

(72) Inventors: Viswanathan Kanakasabai, Bangalore (IN); Jayanti Ganesh, Bangalore (IN); Suma Memana Narayana Bhat, Bangalore (IN); Subbarao Tatikonda, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/564,021

(22) PCT Filed: May 23, 2022

(86) PCT No.: PCT/US2022/030576
§ 371 (c)(1),
(2) Date: Nov. 24, 2023

(87) PCT Pub. No.: WO2022/251131
PCT Pub. Date: Dec. 1, 2022

(65) Prior Publication Data
US 2025/0047142 A1     Feb. 6, 2025

(30) Foreign Application Priority Data
May 25, 2021     (IN) .............................. 202111023329

(51) Int. Cl.
H02J 50/80     (2016.01)
H02J 50/12     (2016.01)
*H02J 50/60*     (2016.01)

(52) U.S. Cl.
CPC .............. H02J 50/80 (2016.02); H02J 50/12 (2016.02); *H02J 50/60* (2016.02)

(58) Field of Classification Search
CPC .............. H02J 50/80; H04B 5/72; H04B 5/79
See application file for complete search history.

(56) References Cited

U.S. PATENT DOCUMENTS

| | | | |
|---|---|---|---|
| 12,212,153 B2 * | 1/2025 | Ganesh ................... | H02J 50/12 |
| 2002/0000792 A1 * | 1/2002 | Hanaki ................... | H02J 50/40 |
| | | | 323/234 |

(Continued)

FOREIGN PATENT DOCUMENTS

WO     2022251131     12/2022

OTHER PUBLICATIONS

"PCT Application No. PCT/US2022/30576 International Search Report and Written Opinion", Dec. 1, 2022, 11 pages.

*Primary Examiner* — Adi Amrany
(74) *Attorney, Agent, or Firm* — DeLizio, Peacock, Lewin & Guerra, LLP

(57)     ABSTRACT

This disclosure provides systems, methods and apparatuses for wireless power transmission and reception. A wireless power transmission apparatus may include a primary coil that transmits power to a corresponding secondary coil in a wireless power reception apparatus. The wireless power reception apparatus may include a variable load. The wireless power transmission apparatus may control the transmission of wireless power based on configuration data and feedback information from the wireless power reception apparatus. The configuration data and feedback information may enable dynamic control of wireless power and may enable the wireless power transmission apparatus to determine an appropriate operating control parameter for the transmission of wireless power to support a load state of the variable load at a particular time. In some implementations, (Continued)

the wireless power transmission apparatus may take into account an operating coupling factor (K-factor) or other information to estimate control parameters.

19 Claims, 19 Drawing Sheets

(56)                    References Cited

U.S. PATENT DOCUMENTS

| 2014/0312833 A1 | 10/2014 | Won et al. | |
| 2018/0138749 A1 | 5/2018 | Lee et al. | |
| 2018/0241248 A1* | 8/2018 | Pan | H04B 5/266 |
| 2019/0310388 A1* | 10/2019 | Park | G01N 27/20 |
| 2021/0257858 A1* | 8/2021 | Moon | H02J 50/12 |
| 2021/0257866 A1* | 8/2021 | Lee | H02J 50/12 |
| 2021/0351631 A1* | 11/2021 | Park | H02J 50/12 |
| 2021/0384769 A1* | 12/2021 | Staring | H02J 50/60 |
| 2022/0337093 A1* | 10/2022 | Draak | H02J 50/80 |

* cited by examiner

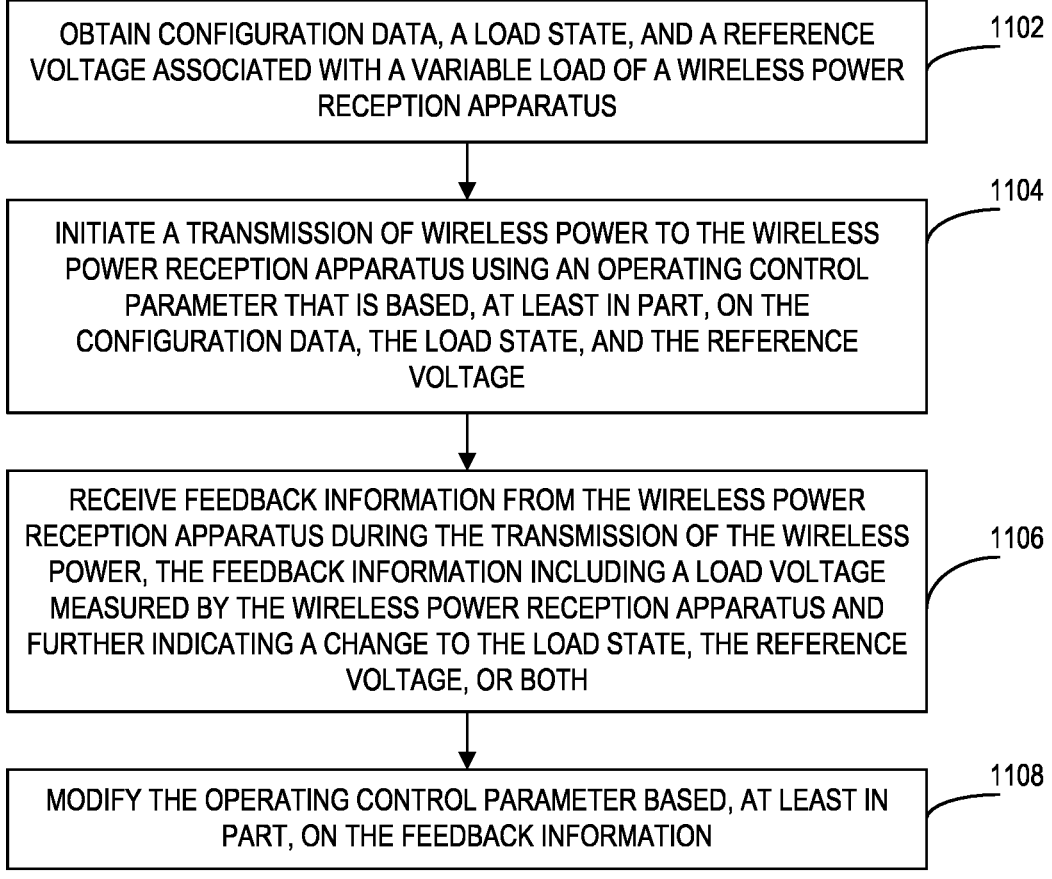

OBTAIN CONFIGURATION DATA, A LOAD STATE, AND A REFERENCE VOLTAGE ASSOCIATED WITH A VARIABLE LOAD OF A WIRELESS POWER RECEPTION APPARATUS — 1102

INITIATE A TRANSMISSION OF WIRELESS POWER TO THE WIRELESS POWER RECEPTION APPARATUS USING AN OPERATING CONTROL PARAMETER THAT IS BASED, AT LEAST IN PART, ON THE CONFIGURATION DATA, THE LOAD STATE, AND THE REFERENCE VOLTAGE — 1104

RECEIVE FEEDBACK INFORMATION FROM THE WIRELESS POWER RECEPTION APPARATUS DURING THE TRANSMISSION OF THE WIRELESS POWER, THE FEEDBACK INFORMATION INCLUDING A LOAD VOLTAGE MEASURED BY THE WIRELESS POWER RECEPTION APPARATUS AND FURTHER INDICATING A CHANGE TO THE LOAD STATE, THE REFERENCE VOLTAGE, OR BOTH — 1106

MODIFY THE OPERATING CONTROL PARAMETER BASED, AT LEAST IN PART, ON THE FEEDBACK INFORMATION — 1108

*FIGURE 11*

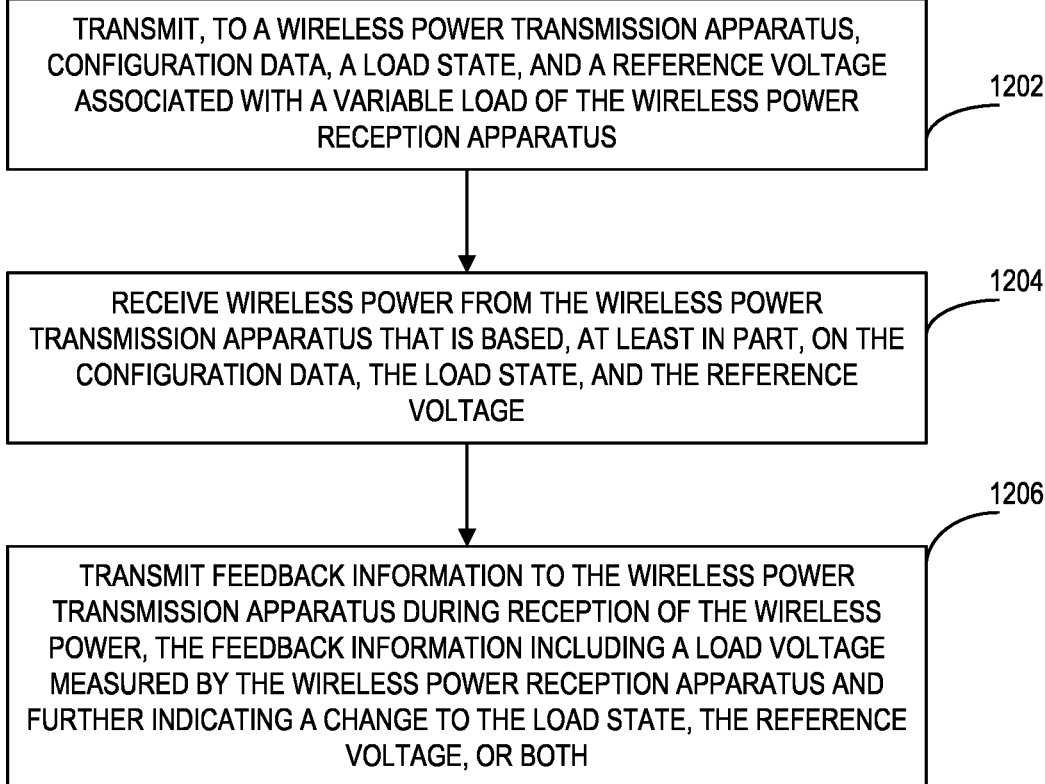

TRANSMIT, TO A WIRELESS POWER TRANSMISSION APPARATUS, CONFIGURATION DATA, A LOAD STATE, AND A REFERENCE VOLTAGE ASSOCIATED WITH A VARIABLE LOAD OF THE WIRELESS POWER RECEPTION APPARATUS ⟋1202

RECEIVE WIRELESS POWER FROM THE WIRELESS POWER TRANSMISSION APPARATUS THAT IS BASED, AT LEAST IN PART, ON THE CONFIGURATION DATA, THE LOAD STATE, AND THE REFERENCE VOLTAGE ⟋1204

TRANSMIT FEEDBACK INFORMATION TO THE WIRELESS POWER TRANSMISSION APPARATUS DURING RECEPTION OF THE WIRELESS POWER, THE FEEDBACK INFORMATION INCLUDING A LOAD VOLTAGE MEASURED BY THE WIRELESS POWER RECEPTION APPARATUS AND FURTHER INDICATING A CHANGE TO THE LOAD STATE, THE REFERENCE VOLTAGE, OR BOTH ⟋1206

*FIGURE 12*

CONFIG
PHASE

SEND CONFIGURATION DATA          1310

CONNECTED
PHASE

IS APPLIANCE ON?          1320

NO

YES

POWER
TRANSFER
PHASE

SEND LOAD STATE, LOAD
VOLTAGE, REFERENCE VOLTAGE          1330

RECEIVE WIRELESS POWER          1340

IS LOAD ON?          1350

NO          SEND LOAD STATE = 0          1360

YES

SEND FEEDBACK INFORMATION
INCLUDING LOAD STATE, LOAD
VOLTAGE, AND OTHER DATA          1370

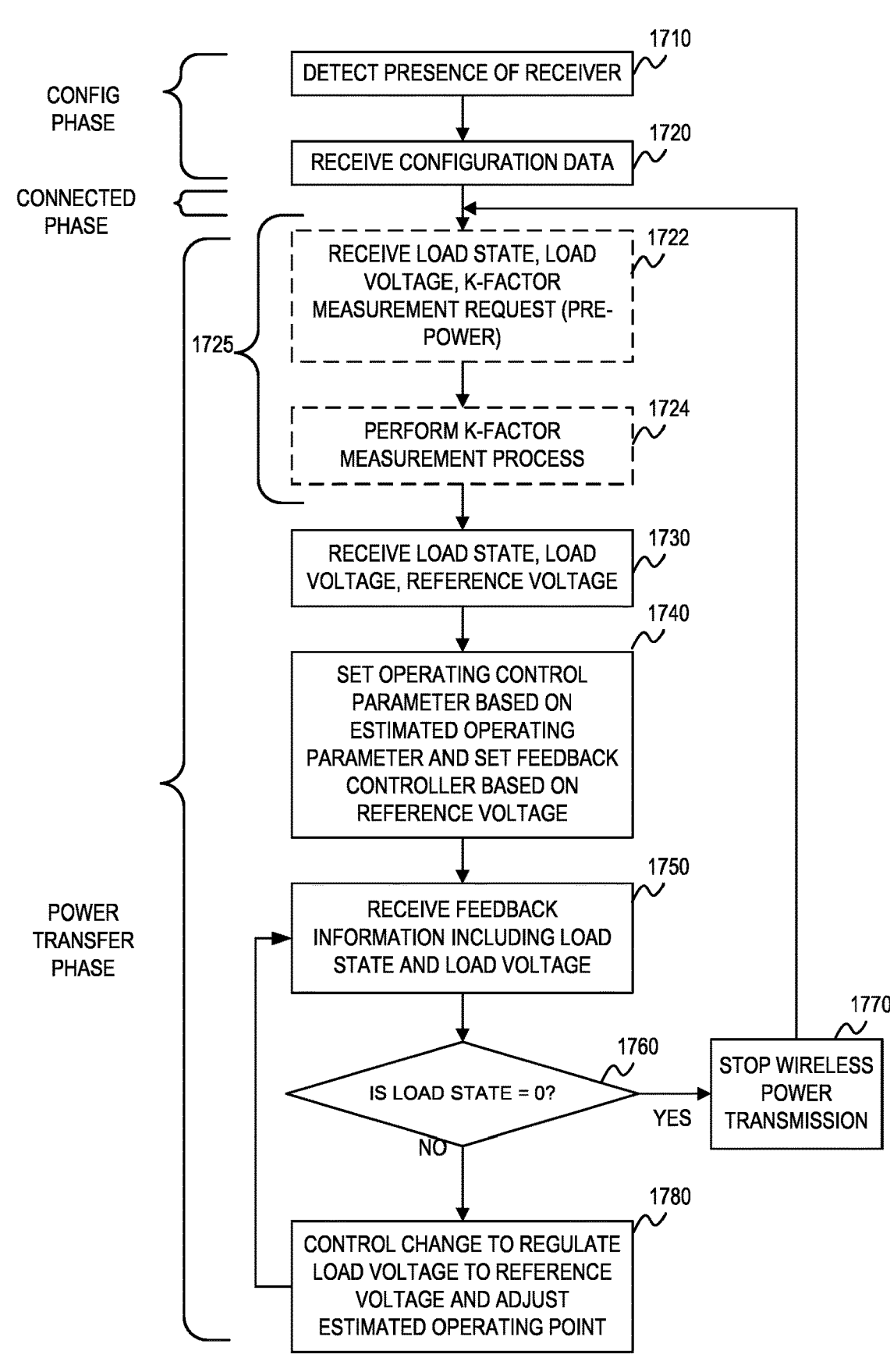

CONFIG PHASE

DETECT PRESENCE OF RECEIVER ⟿ 1710

RECEIVE CONFIGURATION DATA ⟿ 1720

CONNECTED PHASE

RECEIVE LOAD STATE, LOAD VOLTAGE, K-FACTOR MEASUREMENT REQUEST (PRE-POWER) ⟿ 1722

1725

PERFORM K-FACTOR MEASUREMENT PROCESS ⟿ 1724

RECEIVE LOAD STATE, LOAD VOLTAGE, REFERENCE VOLTAGE ⟿ 1730

SET OPERATING CONTROL PARAMETER BASED ON ESTIMATED OPERATING PARAMETER AND SET FEEDBACK CONTROLLER BASED ON REFERENCE VOLTAGE ⟿ 1740

POWER TRANSFER PHASE

RECEIVE FEEDBACK INFORMATION INCLUDING LOAD STATE AND LOAD VOLTAGE ⟿ 1750

IS LOAD STATE = 0? ⟿ 1760

YES

STOP WIRELESS POWER TRANSMISSION ⟿ 1770

NO

CONTROL CHANGE TO REGULATE LOAD VOLTAGE TO REFERENCE VOLTAGE AND ADJUST ESTIMATED OPERATING POINT ⟿ 1780

*FIGURE 17*

DYNAMIC CONTROL OF WIRELESS POWER FOR A VARIABLE LOAD

CROSS-REFERENCE TO RELATED APPLICATIONS

This Patent Application is a National Stage of International Application No. PCT/US2022/30576, filed May 23, 2022, and claims the benefit of priority to India Provisional Patent Application No. 20/211,1023329, filed May 25, 2021, assigned to the assignee hereof, the disclosures of which are incorporated by reference in this Patent Application.

TECHNICAL FIELD

This disclosure relates generally to wireless power. More specifically, this application relates to a wireless power transmission apparatus and a wireless power reception apparatus.

DESCRIPTION OF RELATED TECHNOLOGY

Some wireless power systems utilize wireless power technology to wirelessly provide power to cordless appliances that have a variable load, such as some types of blenders, kettles, air fryers, mixers, etc. In these wireless power systems, a wireless power transmission apparatus maybe installed on or included in a countertop or other flat surface. A wireless power reception apparatus may be included in a cordless appliance. The wireless power transmission apparatus may include a primary coil that produces an electromagnetic field that may induce a voltage in a secondary coil of the wireless power reception apparatus when the secondary coil is placed in proximity to the primary coil. In this configuration, the electromagnetic field may wirelessly transfer power to the secondary coil. The power may be transferred using inductive coupling or resonant coupling between the primary coil and the secondary coil. The wireless power reception apparatus may provide the received power to operate the cordless appliance.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as a method for wireless power transmission. The method may be performed by a wireless power transmission apparatus. In some implementations, the method may include obtaining configuration data, a load state, and a reference voltage associated with a variable load of a wireless power reception apparatus. The method may include initiating a transmission of wireless power to the wireless power reception apparatus using an operating control parameter that is based on the configuration data, the load state, and the reference voltage. The method may include receiving feedback information from the wireless power reception apparatus during the transmission of the wireless power. The feedback information may include a load voltage measured by the wireless power reception apparatus and may further indicate a change to the load state, the reference voltage, or both. The method may include modifying the operating control parameter based on the feedback information.

Another innovative aspect of the subject matter described in this disclosure can be implemented as a method for wireless power reception. The method may be performed by a wireless power reception apparatus. In some implementations, the method may include transmitting, to a wireless power transmission apparatus, configuration data, a load state, and a reference voltage associated with a variable load of the wireless power reception apparatus. The method may include receiving wireless power from the wireless power transmission apparatus that is based on the configuration data, the load state, and the reference voltage. The method may include transmitting feedback information to the wireless power transmission apparatus during reception of the wireless power. The feedback information including a load voltage measured by the wireless power reception apparatus and further indicating a change to the load state, the reference voltage, or both.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 11 shows a flow diagram illustrating example operations of a process for providing wireless power to a wireless power reception apparatus.

FIG. 12 shows a flow diagram illustrating example operations of a process for receiving wireless power in a wireless power reception apparatus.

FIG. 17 shows a flow diagram illustrating example operations of a process in an example wireless power transmission apparatus for transmitting wireless power corresponding to the process described with reference to FIG. 16.

Figure 1:
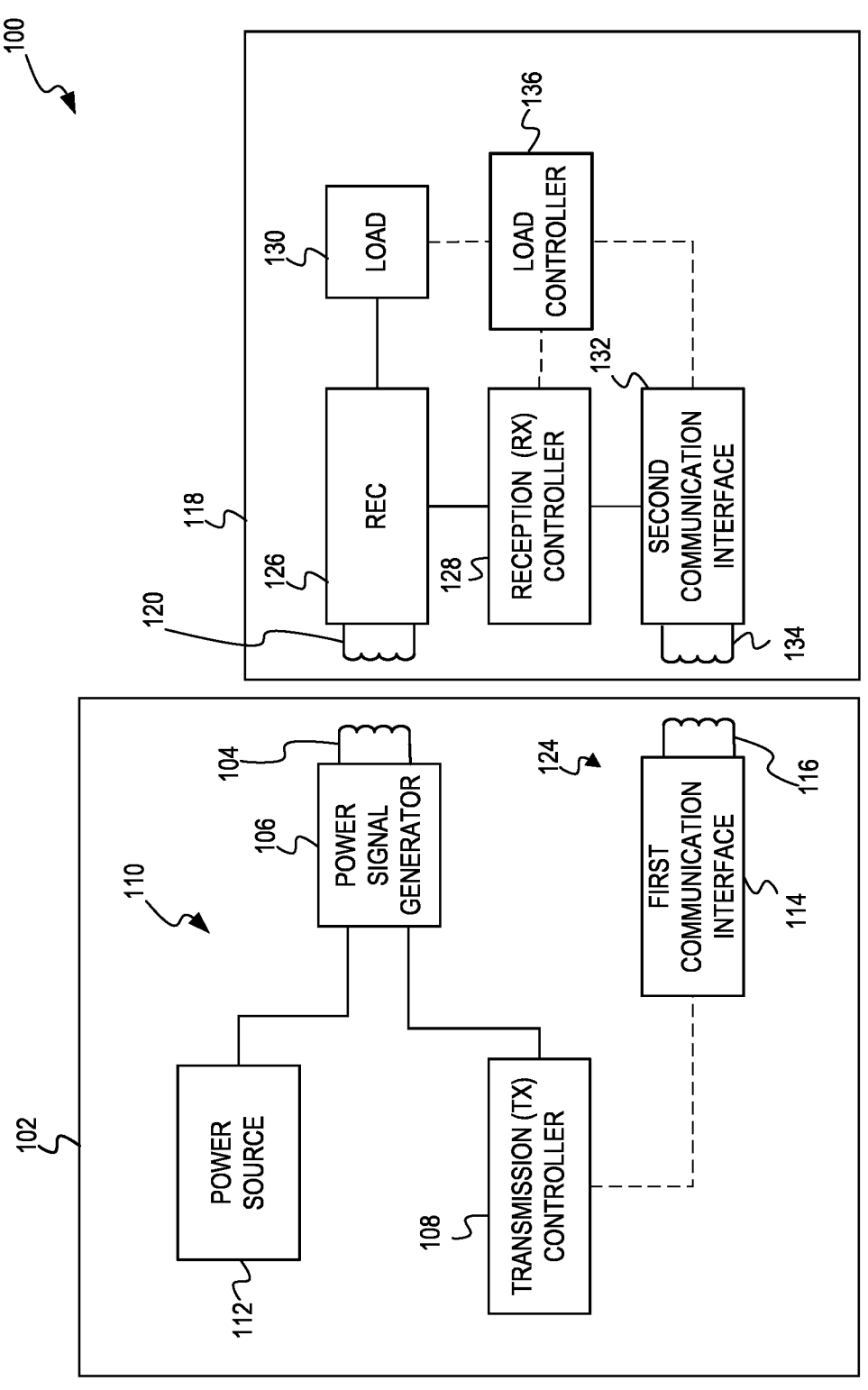
FIG. 1 shows a block diagram of an example wireless power system that includes an example wireless power transmission apparatus and an example wireless power reception apparatus.

Note that the relative dimensions of the figures may not be drawn to scale.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for transmitting or receiving wireless power.

A wireless power system may include a wireless power transmission apparatus integrated with or otherwise disposed on a surface. The wireless power system also may include a wireless power reception apparatus. The wireless power transmission apparatus may include a primary coil that transmits wireless energy (as a wireless power signal) to a corresponding secondary coil in the wireless power reception apparatus. For example, the wireless power transmission apparatus may include a countertop-mounted primary coil or a primary coil that is embedded or manufactured in a surface on which a wireless power reception apparatus can be placed. A primary coil refers to a source of wireless energy (such as inductive or magnetic resonant energy) in the wireless power transmission apparatus. A secondary coil located in the wireless power reception apparatus may receive the wireless energy and utilize it to charge or power a load. A wireless power reception apparatus may be included or integrated with a cordless appliance having a variable load (such as a blender, heating element, a fan, among other examples).

This disclosure provides systems, methods and apparatuses for wireless power transmission and reception. Various implementations relate generally to dynamic control of wireless power transmission from a wireless power transmission apparatus to a wireless power reception apparatus. The dynamic control of wireless power may be based on a load state associated with a variable load of the wireless power reception apparatus. A wireless power reception apparatus may communicate configuration data and feedback information to the wireless power transmission apparatus to determine an operating control parameter for the wireless power transmission. For example, the operating control parameter may include an operating frequency, a duty ratio or voltage such that a primary coil of the wireless power transmission apparatus induces an appropriate amount of power to support the load state of the variable load. In some implementations, a wireless power reception apparatus may communicate the configuration data, a load state, a reference voltage, or any combination thereof, to enable a transmission (TX) controller of the wireless power transmission apparatus to determine an estimated operating parameter that is specific to the wireless power reception apparatus. The wireless power transmission apparatus may determine an operating control parameter based on the estimated operating parameter. During the transmission of wireless power, the wireless power reception apparatus may communicate feedback information to indicate a change in the load state, a measured load voltage, a reference voltage or any combination thereof, to cause the wireless power transmission apparatus to adjust the operating control parameter. In some implementations, the wireless power transmission apparatus also may take into account a coupling factor (K-factor) in the estimation or adjustment of the operating control parameter. In some implementations, a change in wireless power transmission may occur at a synchronization event such that the change in wireless power transmission occurs in relation to a corresponding change in the load state.

In some implementations, the configuration data may include a starting control parameter (such as a starting frequency (Fstart), among other examples). The configuration data may indicate a control parameter limit (such as a frequency limit (Flimit), among other examples). The TX controller may determine the operating control parameter based on the starting control parameter and the control parameter limit. During the transfer of wireless power, the TX controller may adjust the operating control parameter based on the feedback information. For example, the feedback information my indicate a measured load voltage and a reference voltage. The measured load voltage indicates the voltage being delivered to the variable load. The reference voltage indicates a voltage needed to run the variable load at a current load setting. The TX controller may determine a voltage error and adjust the operating control parameter based on the load voltage and the reference voltage. In some implementations, the TX controller also may change the estimated operating parameter based on a change in the load state.

In some implementations, the configuration data may include one or more reference control parameters associated with one or more reference load states. For example, the, the reference control parameters may be based on experimentally obtained data when the wireless power reception apparatus is powered by a reference wireless power transmission apparatus for various load states. In some implementations, the configuration data also may indicate a type of the reference wireless power transmission apparatus. The TX controller may determine an estimated operating parameter based on the load state of the wireless power reception apparatus in comparison to a particular reference load state in the configuration data and select the estimated operating parameter based on the reference control parameter associated with that reference load state. In some implementations, the configuration data may include more than one reference control parameter associated with a particular reference load state. For example, the configuration data may indicate the reference control parameters associated with various reference K-factors for the particular reference load state. The TX controller may determine an operating K-factor between the wireless power transmission apparatus and the wireless power reception apparatus and select the reference control parameter that matches the reference K-factor. In some implementations, the TX controller determine the estimated operating parameter based on an interpolation of two or more reference control parameters when the operating K-factor is between two or more corresponding reference K-factors. An operating K-factor refers to a K-factor based on an actual alignment between the wireless power reception apparatus and the wireless power transmission apparatus that is currently providing wireless power. The reference K-factors may indicate data points under various reference operating conditions and can be interpolated or extrapolated even if the operating K-factor is not exactly the same as the reference K-factors. Thus, the transmission controller may use this information to determine one or more operating control parameters used for providing wireless power that has particular characteristics, such as a particular frequency, duty cycle, voltage, etc. By using the information to determine characteristics of the wireless power transferred to the wireless power reception apparatus, the transmission controller also may provide wireless power that enables relatively efficient operation of the wireless power reception apparatus. For example, the transmission controller may configure the wireless power to enable the wireless power reception apparatus to operate at peak efficiency for a particular load state, load voltage and operating K-factor.

In some implementations, the transmission controller may respond to a load state change by synchronously coordinating a power modification with the wireless power reception apparatus. The load state may indicate that a user has selected a different speed setting for a motor load, a different temperature setting for a resistive load or otherwise changed a user-selectable load state on a cordless appliance. The load state also may indicate states of more than one variable load in the cordless appliance. For example, an air fryer may include a heating element and a fan, each having variable power requirements based on a load setting or programmed operation. The load state may indicate, for example, whether the heating element, the fan, or both, are currently in operation. If a load state changes for a variable load associated with the wireless power reception apparatus, the transmission controller may need to modify the wireless power to accommodate the new load state. The transmission controller may modify the frequency, duty cycle, voltage or any other suitable characteristic of the wireless power. The transmission controller may synchronously coordinate with the wireless power reception apparatus so that the transmission controller commences transmission of the modified wireless power substantially contemporaneously with the wireless power reception apparatus commencing consumption of the modified wireless power. Such synchronous coordination may avoid delays in meeting power requirements of the wireless power reception apparatus. By avoiding these delays, the transmission controller may enable the wireless power reception apparatus to respond more quickly to load state changes and avoid fault conditions that may that strain cordless appliances and degrade user experiences.

In some implementations, the transmission controller may modify one or more operating control parameters used for providing the wireless power based on feedback information received from the wireless power reception apparatus. The feedback information may indicate a change to the load state, a change to the reference voltage, or a fault status, among other examples. The feedback information may be included in one or more feedback messages communicated by the wireless power reception apparatus to the wireless power transmission apparatus. In some implementations, the feedback messages may be formatted to include a load state field, a measured load voltage field, and one or more data fields. A header in the feedback message may indicate a type of data in the one or more data fields. In some implementations, the feedback messages may include a checksum field to ensure reliable delivery of the data. The feedback messages may be communicated during feedback slots that occur at regular intervals in relation to zero-cross events corresponding to the AC mains voltage.

Various implementations also relate generally to a wireless power reception apparatus including a secondary coil that receives power from a corresponding primary coil of a wireless power transmission apparatus. In some implementations, a load controller of the wireless power reception apparatus may synchronously coordinate power changes with the wireless power transmission apparatus. As previously noted, a load state may change for a variable load associated with the wireless power reception apparatus. In response to the load state change, the load controller may notify the wireless power transmission apparatus of the load state. Instead of immediately drawing a modified amount of power from the wireless power transmission apparatus, the load controller may wait for a synchronization event before drawing the modified amount of power from the wireless power transmission apparatus. By waiting for the synchronization event, the load controller can coordinate with the wireless power transmission apparatus to substantially contemporaneously draw the modified power at approximately the same time the wireless power transmission apparatus transmits the modified power.

The techniques of this disclosure may enable a wireless power transmission apparatus to estimate an operating control parameter faster than a wireless power transmission apparatus that does not implement the disclosed techniques. For example, traditional feedback techniques that were designed to modify power after detecting a change in the load. Thus, the traditional feedback technique may cause a delay between a time when a load state is changed and when the wireless power can be provided to accommodate the new load state. The delay in wireless power may cause fault conditions that may strain cordless appliances and degrade user experiences. Using the techniques of this disclosure, a wireless power transmission apparatus may estimate an operating control parameter for a particular load state of the wireless power reception apparatus before the load is actually changed. The wireless power transmission apparatus and the wireless power reception apparatus can coordinate the change in the wireless power transmission and the load, respectively, so that power is available when it is needed to power the load at the load state.

Particular implementations of the subject matter described in this disclosure can be implemented to realize one or more of the following potential advantages. In some implementations the described techniques can be used to configure a wireless power transmission apparatus to provide, at an appropriate time, wireless power having characteristics (such as a particular frequency, duty cycle, voltage, etc.) that enable a wireless power reception apparatus to operate with relative efficiency. In some implementations, the described techniques can be used to achieve synchronous cooperation between the wireless power transmission apparatus and the wireless power reception apparatus when responding to a change of a load state. These techniques may avoid delays associated with traditional feedback mechanisms that were designed to facilitate power modification. These techniques also may enhance user experiences by increasing responsiveness to load state changes.

While the examples in this disclosure are based on wireless power used in kitchen systems, the techniques are applicable to other types of systems. For example, the techniques may be used with wireless power systems associated with home appliances, electronic devices, fans, space heaters, speaker systems, air compressors, garden equipment, or components of an electric vehicle, among other examples. Furthermore, some examples of this disclosure are based on voltage control in which an operating frequency or other parameters may be controlled based on voltage control feedback information. However, the techniques are also applicable to power control in which operating parameters may be controlled based on power control feedback information.

FIG. 1 shows a block diagram of an example wireless power system that includes an example wireless power transmission apparatus and an example wireless power reception apparatus. In FIG. 1, dashed lines represent communications to distinguish from solid lines that represent electrical circuit lines.

The wireless power system 100 includes a wireless power transmission apparatus 102 and a wireless power reception apparatus 118. The wireless power transmission apparatus includes a primary coil 104. The primary coil 104 may be associated with a power signal generator 106. The primary coil 104 may be a wire coil which transmits wireless power (which also may be referred to as wireless energy). The primary coil 104 may transmit wireless energy using inductive or magnetic resonant field. The power signal generator 106 may include components (not shown) to prepare the wireless power. For example, the power signal generator 106 may include one or more switches, drivers, series capacitors, rectifiers or other components.

In some implementations, the power signal generator 106, TX controller 108 and other components (not shown) may be collectively referred to as a power transmitter circuit 110. Some or all of the power transmitter circuit 110 may be embodied as an integrated circuit (IC) that implements features of this disclosure for controlling and transmitting wireless power to one or more wireless power reception apparatuses. The TX controller 108 may be implemented as a microcontroller, dedicated processor, integrated circuit, application specific integrated circuit (ASIC) or any other suitable electronic device.

The power source 112 may provide power to the power transmitter circuit 110 in the wireless power transmission apparatus 102. The power source 112 may convert alternating current (AC) power to direct current (DC) power. For example, the power source 112 may include a converter that receives an AC power from an external power supply and converts the AC power to a DC power used by the power signal generator 106.

The TX controller 108 is connected to a first communication interface 114. The first communication interface 114 is connected to a first communication coil 116. In some implementations, the first communication interface 114 and the first communication coil 116 may be collectively referred to as the first communication unit 124. In some implementations, the first communication unit 124 may support Near-Field Communication (NFC). NFC is a technology by which data transfer occurs on a carrier frequency of 13.56 Megahertz (MHz). The first communication unit 124 also may support any suitable communication protocol.

The wireless power reception apparatus 118 may include a secondary coil 120, a rectifier 126, a reception (RX) controller 128, a second communication interface 132, a load controller 136, a load 130, and a memory (not shown). In some implementations, the load 130 may also include a drive (not shown) for controlling at least one parameter such as speed or torque of the load. In some implementations, the rectifier 126 may be omitted. In some implementations, a series switch (not shown) may be included in series with the secondary coil 120. Although shown as different components, some components may be packaged or implemented in the same hardware. For example, in some implementations, the RX controller 128 and the load controller 136 may be implemented as a single controller. The RX controller 128, the load controller 136, or any combination thereof, may be implemented as a microcontroller, dedicated processor, integrated circuit, application specific integrated circuit (ASIC) or any other suitable electronic device.

The TX controller 108 may detect the presence or proximity of a wireless power reception apparatus 118. This detection may happen during a periodic pinging process of the first communication interface 114 in the wireless power transmission apparatus 102. During the pinging process, the first communication interface 114 also may supply power (via the first communication coil 116) to the second communication interface 132 (via the second communication coil 134) when the wireless power reception apparatus 118 is in proximity. The second communication interface 132 may "wake up" and power-up the RX controller 128 and may send a reply signal back to the first communication interface 114. Prior to power transfer, a handshaking process may take place during which the TX controller 108 may receive data configuration related to the power rating of the receiver, among other information.

Different cordless appliances have different load types, different load states, and different power requirements or may require power at a particular voltage and frequency. For example, a cordless blender may include a variable motor load that has multiple user-selectable load states to control motor speed. Depending on the load state, the cordless blender may require different levels of power to operate. In another example, a cordless kettle may include a resistive load that has different load states to control temperature. In yet another example, an air fryer may be a compound load device and may operate a heater, a fan, or both, at various periods of operation. Each type of load (such as the motor, the resistive load, the heater, the fan, or any combination thereof) may require different amounts of power to operate based on a current load state or load state. Furthermore, cordless appliances may exhibit different levels of voltage gains from a primary coil to a receiver coil at different primary coil excitation frequencies (such as a wireless power transfer frequency) depending on their load type or load state. For example, to achieve a desired load voltage, a cordless blender may operate best at a first operating frequency for a first load state, such as a low motor speed setting. However, as the load state changes, the cordless blender may not achieve the same load voltage when operated at the first operating frequency. For example, the first operating frequency may facilitate a first voltage gain when the cordless blender is set to a first load state (such as a low-speed setting), but the first operating frequency may provide a lower voltage gain when the cordless blender is set to a second setting (such as a higher-speed setting).

In some implementations, a cordless appliance may have user-selectable load states or user-selectable load patterns of operation. A user may select a first load state to start-up a cordless appliance. While the cordless appliance is operating at the first load state, the user may select a second load state that requires more or less power. Absent the techniques in this disclosure, the wireless power reception apparatus may immediately begin consuming a different amount of power in response to a change in the load state. However, there may be some delay before the wireless power transmission apparatus can provide the amount of power required by the wireless power reception apparatus. These delays may cause low voltage conditions, over voltage conditions, hardware damage or failure, and other faults in the cordless appliance.

Another factor that may alter voltage gain is based on an alignment of the secondary coil 120 and the primary coil 104 during power transfer. Voltage gain may be measured in terms a ratio of voltage received by the/secondary coil 120 to voltage applied at the primary coil 104. A coupling factor, referred to as K-factor, may be an indicator of the alignment and may be calculated based on a ratio of the voltage applied to the primary coil 104 and a voltage measured at the secondary coil 120 during a K-factor determination process. The K-factor determination process may be performed at a time when there is no current flowing through the secondary coil 120. For example, the K-factor determination process may be performed such that the voltage applied to the primary coil 104 and the measurement of the corresponding received voltage in the secondary coil 120 occurs during a zero-cross event on the AC mains voltage. In some implementations, a switch (not shown) may be disconnected the secondary coil 120 from the rectifier 126 during the K-factor determination process. The K-factor determination process may be periodically performed during time slots associated with zero-cross events. In some implementations, a number of turns in the primary coil 104 and the secondary coil 120 may impact the K-factor calculation. For example, the K-factor may be calculated based on a multiplication of a first operand and a second operand, where the first operand is the voltage measured at the secondary coil 120 divided by the number of coil turns of the secondary coil 120, and where the second operand is the number of coil turns in the primary coil 104 divided by the voltage applied to the primary coil 104.

An operating K-factor indicates the present alignment of the primary coil 104 and the secondary coil 120. The wireless power reception apparatus 118 may experience different voltage gains at different operating frequencies at different K-factors. A reference K-factor and reference operating frequency may be determined based on lab testing while the wireless power reception apparatus 118 is operating at a reference load state on a reference wireless power transmission apparatus (not shown). The reference load state, the reference operating frequency, and the reference K-factor may represent a data point that can be used by the TX controller 108 to determine an estimated operating parameter when it receives a message indicating the load state of the load 130 from the wireless power reception apparatus 118.

Wireless power transmission is more efficient when the primary and secondary coils are optimally aligned. Conversely, the efficiency may decrease (or the power transmission may cease) when the primary and secondary coils are misaligned. When properly aligned, primary coils and secondary coils can transfer wireless energy up to an amount predetermined by a wireless standard. For example, with proper alignment, a primary coil may convey power ranging from 30 Watts (W) up to 2.2 Kilowatts (KW). Because alignment affects the efficiency of power transmission, the wireless power transmission apparatus may modify the amount of wireless power based on its alignment with the wireless power reception apparatus.

The TX controller 108 may control characteristics of wireless power it provides to the wireless power reception apparatus 118. After detecting the wireless power reception apparatus 118, the TX controller 108 may receive configuration data from a wireless power reception apparatus 118. For example, the TX controller 108 may receive the configuration data during a hand shaking process with the wireless power reception apparatus 118. Among other examples, the configuration data may indicate one or more reference control parameters such as operating frequencies of the wireless power reception apparatus 118 at different reference K-factors, load states, load voltages and load powers of the wireless power reception apparatus 118 when it was operated on a reference wireless power transmitter apparatus. In some implementations, the configuration data may include estimator data (such as interpolation points, vector values, etc.) that enables the TX controller 108 to adapt locally stored information to suit various conditions and settings, so the TX controller 108 can provide power that enables the wireless power reception apparatus 118 to operate relatively efficiently. In some implementations, the wireless power reception apparatus 118 may provide an empirical formula for computing one or more reference control parameters as a function of a reference K-factor, a load voltage and a load power. The TX controller 108 may use the configuration data to determine at least one estimated operating parameter (such as frequency, duty cycle, voltage, etc.) for wireless power it provides to the wireless power reception apparatus 118. The TX controller 108 may initially set the operating control parameter based on the estimated operating parameter. The operating control parameter, the estimated operating parameter, or both, may be adjusted based on feedback information from the wireless power reception apparatus 118 during the transfer of wireless power in response to a change in the load state or power requirement of the load 130. Thus, the TX controller 108 may provide wireless power that enables relatively efficient operation of the wireless power reception apparatus 118. For example, the transmission controller may configure the wireless power to enable the wireless power reception apparatus to operate at peak efficiency for a particular load state, load voltage and operating K-factor.

The format of the configuration data provided by the wireless power reception apparatus 118 may vary in different implementations. For example, configuration data may include the estimator data to indicate one or more reference control parameters such as operating frequencies associated with one or more reference K-factors between the wireless power reception apparatus and a reference wireless power transmission apparatus, at one or more load states of the wireless power reception apparatus that were obtained during a test of the wireless power reception apparatus 118 on a reference wireless power transmission apparatus. The load state is a representation that reflects a combined state of load voltage and corresponding load power setting of the wireless power reception apparatus 118. The configuration data may include an indication of the type of reference wireless power transmission apparatus that was used for the test.

In another form, the configuration data may include a starting control parameter in lieu of or in addition to the estimator data. For example, the starting control parameter may indicate a starting frequency (Fstart), duty cycle, starting voltage, or other parameters. In some implementations, the configuration data may include a control parameter limit. For control parameter limit may indicate a frequency limit (Flimit). The TX controller 108 may determine the estimated operating parameter or adjust the operating control parameter such that the resultant operating control parameter will not become lower than the Flimit Table 1 illustrates an example format of the configuration data. The example in Table 1 is provided for pedagogical purposes only and some formats or fields may be added or omitted.

TABLE 1

Example configuration data format

| Description | Symbol/Data | Bits | Example Values/comments |
|---|---|---|---|
| Control type | C | 8 | 2 for voltage control |
| Rated appliance voltage | URxR (in Volts) | 8 | e.g. 230 (max - 256 V) |
| Rated appliance power | PRxR (in Watts) | 16 | e.g 1200 |
| Secondary coil distance from interface surface | Zs (in mm) | 8 | e.g. 5 |
| Number of coil turns in secondary coil | N2 | 8 | e.g. 40 |
| Secondary coil free air inductance | Ls (in microHenries) | 16 | e.g. 270 |
| Receiver resonance capacitance | Cs in (nanoFarads) | 16 | '0' if no resonance is used |
| Estimator data size | Est_data_size | 8 | Est_data_size = 0 when no estimation data is available (estimation can be done by analytical calculation) E.g. Est_data_size = 12; Number of rows defined in estimator data 12 (bytes = 12*(3 bits + 5 bits + 8 bits)/(8 bits) = 24) |
| Starting control parameter (such as starting frequency) | Fstart (in kHz) | 8 | when Est_data_size = 0, this is the recommended starting frequency of operation (default = 50) |
| Control parameter limit (such as frequency limit) | Flimit (in kHz) | 8 | when Est_data_size = 0, this is the minimum recommended operating frequency (e.g. 30) |
| Reference transmitter used for estimation data | RefTx | 8 | When Est_dat_size ≠ 0, this may indicate the type of reference wireless power transmission apparatus (such as 1- general hob transmitter, 2- general hidden transmitter |
| Estimator data | entries | 16 bits per entry | When Est_dat_size ≠ 0 |

When the configuration data includes estimator data (Est_data_size≠0), the configuration data also may include a quantity of entries for the estimator data. Est data size may indicate the how many entries or may indicate a total byte length of the estimator data. Table 2 illustrates an example format for the estimator data entries.

TABLE 2

Example Estimator Data Format

| Reference load state (up to 8 reference load states) | Reference K-factor | Reference operating parameter (such as starting/recommended frequency of operation based on operation on reference transmitter |
|---|---|---|
| 3 bits | 5 bits | 8 bits |

Some types of wireless power reception apparatus 118 may have more load states than others. For example, if the wireless power reception apparatus 118 is a blender with a single speed setting or a blender with section windings, the estimator data may include only one reference load state. In some implementations, the values in the estimator data may be normalized to reduce overhead. For example, the reference K-factor may be normalized on a scale of 32 ($2^5$). Kmax (0.7 or 70%) and Kmin (0.2 or 20%) data may be minimum needed reference K-factors. Estimator data related to other reference K-values may be supplied. In some implementations, the reference K-factors may be omitted in the estimator data entries.

In addition to the configuration data, the wireless power reception apparatus 118 also may provide a load state indicating the present or anticipated load state of the load 130. In some implementations, the wireless power reception apparatus 118 may provide a reference voltage (or requested power). The TX controller 108 may determine the estimated operating parameter by matching the load state with a reference load state in one or more of the entries in the estimator data. When the estimator data includes two or more entries having the same reference load state, the TX controller 108 may select which entry or interpolate between two entries based on the operating K-factor and the reference K-factor. Thus, the TX controller 108 can determine a reference operating parameter to use for estimation of the estimated operating parameter. When the estimator data is not included in the configuration data, the TX controller 108 may use the starting control parameter as the reference operating parameter. The TX controller 108 may determine the estimated operating parameter based on the reference operating parameter and reference voltage.

TX controller 108 may respond to a load state change by synchronously coordinating a power modification with the wireless power reception apparatus 118. The load state may indicate that a user has selected a different speed setting for a motor load, a different temperature setting for a resistive load or otherwise changed any suitable setting on a cordless appliance. A load state change may also be initiated by the appliance without user intervention in order to achieve desired performance. For example, the appliance controller may turn on and off a heater without user intervention to regulate a temperature. If a load state changes for a variable load associated with the wireless power reception apparatus, the TX controller 108 may need to modify the wireless power to accommodate the change. The TX controller 108 may modify the frequency, duty cycle, voltage or any other suitable characteristic of the wireless power. The TX controller 108 may synchronously coordinate with the wireless power reception apparatus 118 so that the TX controller 108 commences transmission of the modified wireless power substantially contemporaneously to when the wireless power reception apparatus 118 commences consumption of the modified wireless power. Such synchronous coordination may avoid delay in meeting power requirements of the wireless power reception apparatus 118. By avoiding these delays, the TX controller 108 may enable the wireless power reception apparatus to avoid fault conditionals that may that strain cordless devices or degrade user experiences. In some implementations, the TX controller 108 may modify the wireless power based on information received from the wireless power reception apparatus. The information may include the load state, an estimated power needed by the variable load, voltage information for determining an operating K-factor and a reference voltage indicating a voltage needed by the variable load. The TX controller 108 may use some or all of the information to determine an operating control parameter by which to modify the wireless power. In some implementations, the TX controller 108 may commence transmission of the modified wireless power in response to any suitable synchronization event, such as when an AC power feeding the wireless power transmission apparatus 102 crosses zero volts.

In some implementations, the wireless power reception apparatus 118 may be included in a cordless appliance, such as a cordless blender, cordless kettle, cordless juicer, etc. The wireless power reception apparatus 118 may include a secondary coil 120, a rectifier 126, and an RX controller 128. When the secondary coil 120 is aligned to the primary coil 104, the secondary coil 120 may generate an induced voltage based on a received wireless power signal from the primary coil 104. A capacitor may be in series between the secondary coil 120 and the rectifier 126. The rectifier 126 may rectify the induced voltage and provide the induced voltage to a load 130. The load 130 may be any suitable load such as a variable motor load, variable resistive load or a variable induction heating load. The load may include an additional electronic drive (not shown).

A RX controller 128 may be operationally coupled to the rectifier 126 and the second communication interface 132. The second communication interface 132 may contain modulation and demodulation circuits to wirelessly communicate via the second communication coil 134. Thus, the RX controller 128 may wirelessly communicate with the feedback controller 122 via the second communication interface 123 to the first communication interface 114 using NFC communications. Alternatively or additionally, the RX controller 128 may use load modulation to communicate via an in-band communication link (not shown) that includes the secondary coil 120.

A load controller 136 may be operationally coupled to the load 130 and the second communication interface 132. The load controller 136 may detect changes to load states. For example, the load controller 136 may detect changes to user-selectable load states, such as temperature selectors and motor speed selectors. The load controller 136 also may determine a load voltage reference and load state based on the power estimate. The load controller 136 also may provide load states, load voltage references and any other suitable information to the RX controller 128 or the second communication interface 132 for communication to the wireless power transmission apparatus 102. The RX controller 128 may additionally determine and provide feedback information indicating a measured load voltage available to the load 130. In some feedback messages, the feedback information may include a reference voltage indicating a required voltage for the load 130. In some feedback messages, the feedback information may include coil voltage measured at the secondary coil 120 as part of a K-factor determination process. Although the RX controller 128 and load controller 136 are shown separately, they may be included in the same component of the wireless power reception apparatus 118.

In some implementations, the load controller 136 may synchronously coordinate changes to the wireless power with the wireless power transmission apparatus 102. For some motor loads, the load controller 136 also may control additional hardware (such as switches and drivers) associated with the load (not shown in FIG. 1). In some implementations, these additional switches may be turned on or off to realize a change of load in synchronization with a change to wireless power transmission. As previously noted, a load state may change for the load 130. In response to the load state change, the load controller 136 may notify the wireless power transmission apparatus 102 of the load state change. Instead of immediately drawing an amount of power commensurate with the load state, the load controller 136 may wait for a synchronization event before configuring the load 130 to draw the modified amount of wireless power. By waiting for the synchronization event, the load controller 136 may coordinate with the wireless power transmission apparatus 102 to substantially contemporaneously commence consumption of the modified wireless power at approximately the same time the wireless power transmission apparatus commences production of the modified power. The synchronization event may be any suitable event such as when the average direct current (DC) voltage (based on the line frequency of the AC mains feeding the wireless power transmission apparatus) after the rectifier 126 is close to a minimum value (such as zero volts). In another example, the synchronization event may correspond to the time when the AC mains voltage feeding the wireless power transmission apparatus crosses zero volts.

In some implementations, the techniques for determining the operating control parameter for wireless power may be performed from the onset of initiating wireless power transmission to a wireless power reception apparatus 118, such as during an initialization phase of the wireless power transmission. In some implementations, the techniques also may be used to determine a new operating control parameter in response to feedback information indicating a change in the load state, reference voltage, or operating K-factor.

Figure 2A:
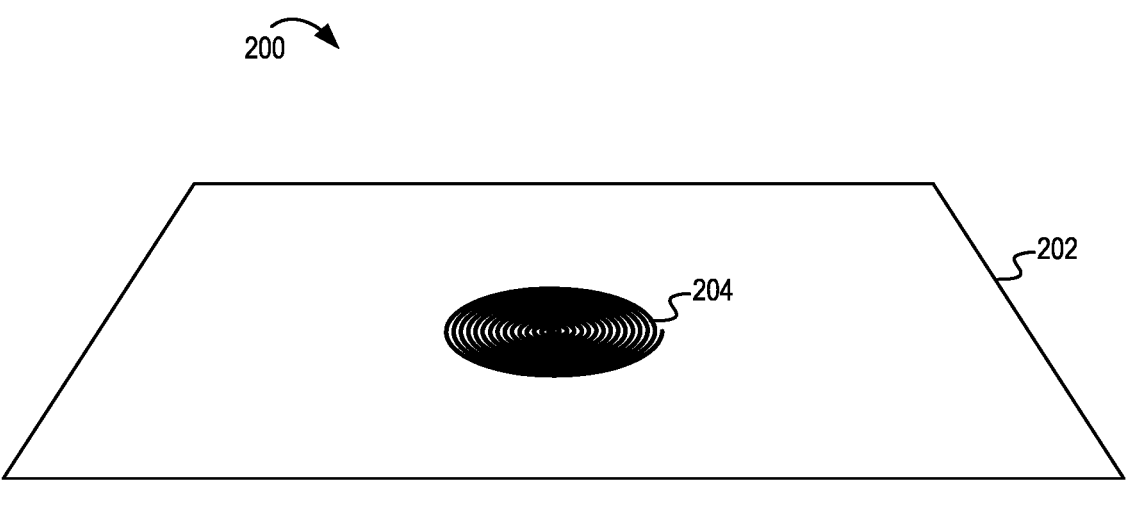
FIG. 2A illustrates a perspective view of an example countertop-mounted wireless power transmission apparatus.

FIG. 2A illustrates a perspective view 200 of an example countertop-mounted wireless power transmission apparatus. In some implementations, the wireless power transmission apparatus may be coupled with or integrated with a countertop 202. For example, a primary coil 204 of the wireless power transmission apparatus may be flush-mounted into the countertop 202. For brevity, only the primary coil 204 of the wireless power transmission apparatus is illustrated in FIG. 2A. However, other components of the wireless power transmission apparatus, such as those describe with reference to FIG. 1, may be integrated or mounted into the countertop 202.

Figure 2B:
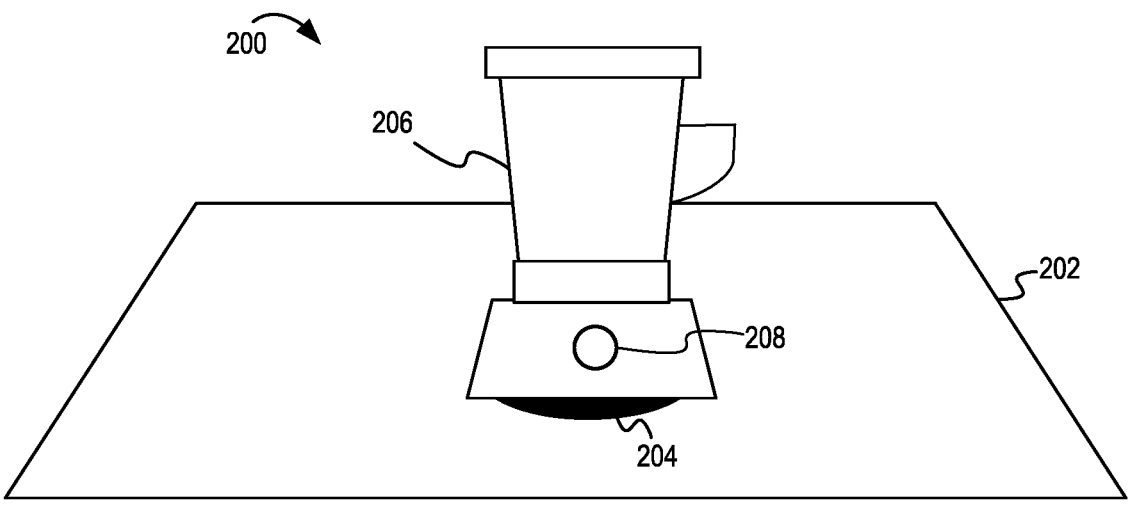
FIG. 2B illustrates a perspective view of an example countertop-mounted wireless transmission apparatus and an example cordless appliance.

FIG. 2B illustrates a perspective view 200 of an example countertop-mounted wireless transmission apparatus and an example cordless appliance. The cordless appliance (shown as a blender 206) may be placed on the primary coil 204. The cordless appliance may include a user-selectable load setting 208. The cordless appliance may include a wireless power reception apparatus (not shown in FIG. 2B). The wireless power transmission apparatus and the wireless power reception apparatus may include any of the components and functionalities described herein.

Figure 3:
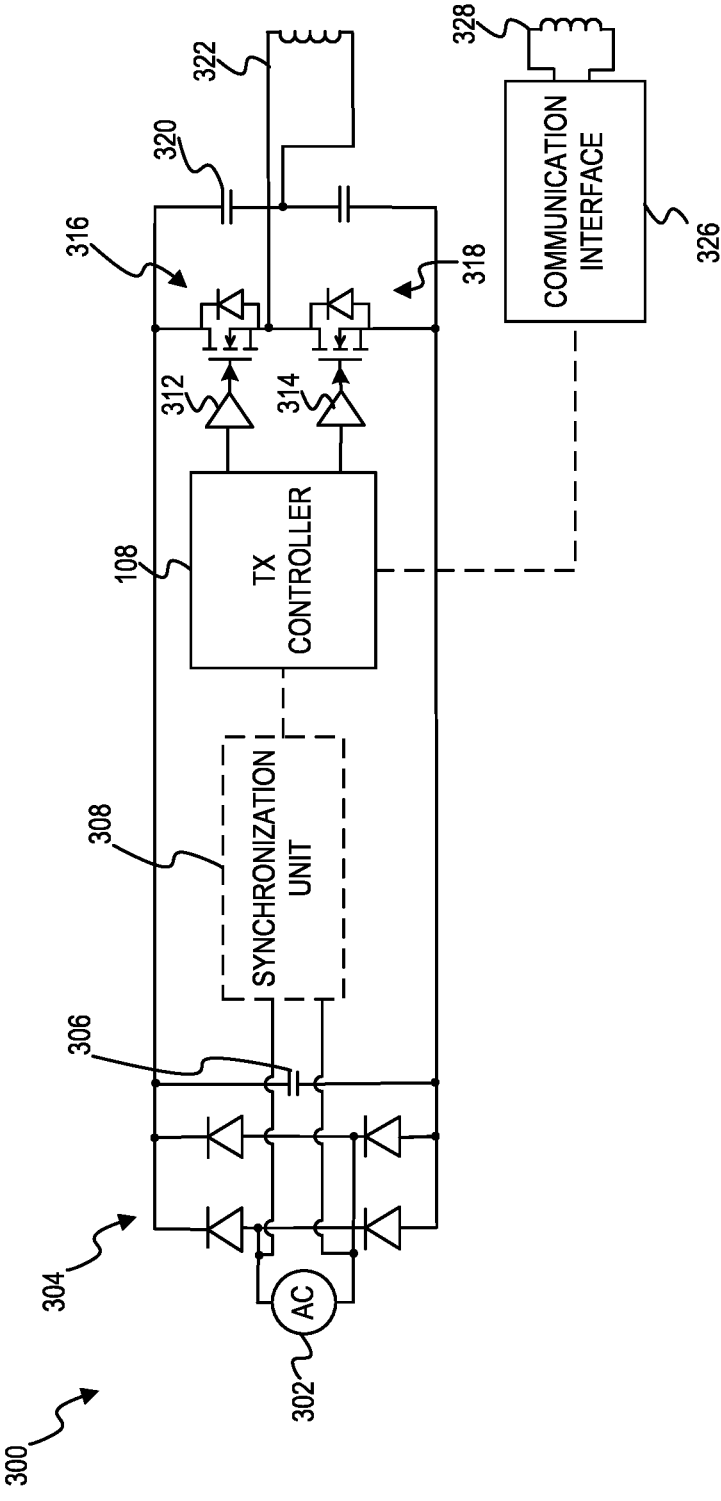
FIG. 3 shows a block diagram conceptually illustrating an example wireless power transmission apparatus.

FIG. 3 shows a block diagram conceptually illustrating an example wireless power transmission apparatus. In FIG. 3, the wireless power transmission apparatus 300) may include a power source 302, which is shown as an AC power source. However, the power source 302 may be a DC power source or any other suitable source power. The power source 302 may be connected to a rectifier 304 which may be connected to a capacitor 306. The power source 302 also may be connected to a synchronization unit 308. The synchronization unit 308 may generate a synchronization signal based on AC power from the power source 302. The synchronization unit 308 may provide the synchronization signal to a TX controller 108. When the power source 302 is a DC source, the synchronization unit can voluntarily generate signals at regular intervals.

The rectifier 304 may provide DC power to a first switch 316 and a second switch 318. The first switch 316 and the second switch 318 may be metal-oxide-semiconductor field-effect transistors (MOSFETs) or Insulated Gate bipolar Transistors (IGBTs), among other examples. A first pulse width modulator (PWM) driver 312 may be connected to the first switch 316, and a second PWM driver 314 may be connected to the second switch 318. The TX controller 108 may be connected to the first PWM driver 312 and the second PWM driver 314.

The TX controller 108 may exchange communications with a wireless power reception apparatus via a communication interface 326. The communication interface 326 may include a communication controller (not shown) connected to a communication coil 328. In some implementation, the communication interface 326 and the communication coil 328 are configured to communicate using an NFC communication protocol.

The wireless power transmission apparatus 300 may provide wireless power to a wireless power reception apparatus. The TX controller 108 may detect the wireless power reception apparatus in proximity to the primary coil 322 and conduct a handshaking process during which the TX controller 108 receives information from the wireless power reception apparatus. The TX controller 108 may receive the information via the communication interface 326. The information may include one or more reference control parameters such as operating frequencies of the wireless power reception apparatus at different reference K-factors, load voltages and load powers of the wireless power reception apparatus. The information also may indicate a load type and a load state for a variable load associated with the wireless power reception apparatus. Load state represents the combined state of load voltage and corresponding load power of the appliance. The TX controller 108 may utilize this information to provide wireless power having characteristics that enable the wireless power reception apparatus to operate, from the onset, with relative efficiency. For example, the TX controller 108 may select a reference control parameter, such as frequency for the wireless power, based on the load state information received from the wireless power reception apparatus. The TX controller 108 may determine an operating control parameter and provide wireless power by controlling the first and second PWM drivers (312 and 314, respectively) based on the operating control parameter. The PWM drivers (312 and 314, respectively) may operate the first switch 316 and the second switch 318. The first switch 316 and second switch 318 may energize the primary coil 322 in a manner that transmits wireless power according to the operating control parameter to a secondary coil of the wireless power reception apparatus.

After providing power, the wireless power transmission apparatus 300 may modify the operating parameters based on one or more changing conditions, such as a change to a load state associated with a load connected to the wireless power reception apparatus. In response to the changing conditions, the TX controller 108 and the wireless power reception apparatus may modify their respective configurations to accommodate the change in conditions. For example, the TX controller 108 may determine one or more new operating control parameters (such as frequency of the wireless power) to accommodate the load state change. The TX controller 108 and the wireless power reception apparatus may implement their respective configuration changes in response to a synchronization event. In some implementations, the TX controller 108 commences provision of the modified wireless power substantially contemporaneously with the wireless power reception apparatus commencing consumption of the modified wireless power.

Figure 4A:
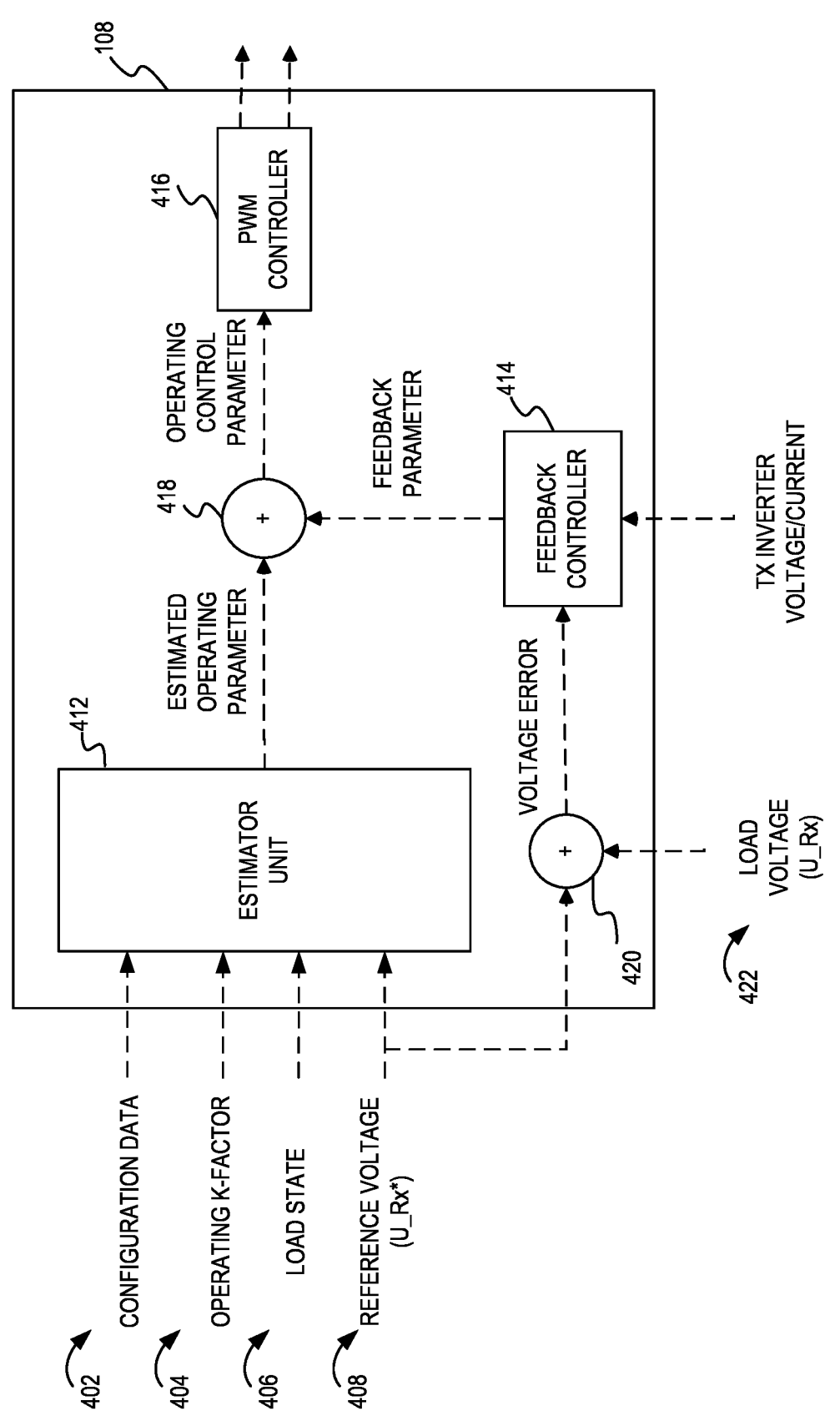
FIG. 4A shows a block diagram conceptually illustrating components of an example transmission controller using voltage control.

FIG. 4A shows a block diagram conceptually illustrating components of an example TX controller. The TX controller 108 may reside in a wireless power transmission apparatus, such as any of the wireless power transmission apparatus 102 and 300 described with reference to FIGS. 1 and 3, respectively. In FIG. 4A, the TX controller 108 may include an estimator unit 412 configured to determine an estimated operating parameter. The estimator unit 412 that may use configuration data 402 received from the wireless power reception apparatus to determine a starting control parameter or a reference control parameter as the basis for the estimated operating parameter. In some implementations, the estimator unit 412 also may use an operating K-factor 404, a load state 406, a reference voltage, or any combination thereof, to determine the estimated operating parameter.

As described herein, a wireless power transmission apparatus may provide power having characteristics (such as a selected frequency) that enables a wireless power reception apparatus to operate with relative efficiency. During or after a handshaking process, the TX controller 108 may receive configuration data from the wireless power reception apparatus. The configuration data may include one or more reference control parameters such as operating frequencies of the wireless power reception apparatus at different reference K-factors and reference load states of the wireless power reception apparatus. The TX controller 108 may determine an operating K-factor based on feedback from the wireless power reception apparatus as well as information about a transmit voltage during a K-factor determination process. The TX controller 108 also may receive a load state 406 indicating a present operating state of the load. The load state is a representation of load power of the appliance at a particular load voltage. The load state 406 may be associated an estimated power needed by a load (also referred to as a load power estimate or estimated load power). The configuration data may indicate load power estimates for various reference load states. Upon receiving feedback information from the wireless power reception apparatus indicating the load state (sometimes referred to a load state feedback), the TX controller 108 may determine the load power estimate using the load state 406 for the reference load state that matches the load state feedback. The TX controller 108 also may receive a reference voltage indicating a voltage needed by the load.

Prior to providing power, the TX controller 108 may determine an operating K-factor based on K-factor feedback information received from the wireless power reception apparatus. For example, a K-factor determination unit (not shown) may determine the operating K-factor between the wireless power transmission apparatus and the wireless power reception apparatus (such as under a zero-current condition in the secondary coil) based on a ratio of a received voltage at the secondary coil of the wireless power reception apparatus and a transmitted voltage at the primary coil measured at the wireless power transmission apparatus. The received voltage and the transmitted voltage may be measured by the wireless power reception apparatus and the wireless power transmission apparatus, respectively, at a consistent time such as a measurement slot in relation to a synchronization event. A K-factor determination process may occur during a time when no current is passing through the secondary coil of the wireless power reception apparatus.

The TX controller 108 also may determine the load power estimate as an estimate of power needed by the load. The load power estimate may be based on the load state 406 received in the feedback information. The load state 406 may be a current or anticipated load state of the wireless power reception apparatus. For example, the wireless power reception apparatus may transmit a feedback or other message indicating a load state. The TX controller 108 may determine the load power estimate based on the load state 406. The load state also may indicate whether the transmitter needs to be kept energized or switched off. For example, a load state of first value (such as "0)") may indicate that the receiver is intended to be turned off. In order to keep the losses minimal, the transmitter electronics are also turned off. In some implementations, feedback information may indicate a fault state (not shown in figure) associated with a fault in the appliance. Depending upon the type of fault state, the transmitter may discontinue or reduce the transmitted power.

The estimator unit 412 may determine an estimated operating parameter based on one or more of the configuration data 402, the operating K-factor 404, the load state 406 and a reference voltage (U_RX*) 408. In some implementations, the configuration data may include estimator data. The estimator data may include reference control parameters (such as operating frequency) when operating with a reference wireless power transmission apparatus at one or more reference K-factors and one or more states. In some implementations, the estimator unit 412 may utilize the operating K-factor, the load state and the reference voltage to interpolate and extrapolate the estimator data to determine the estimated operating parameter. The estimator unit 412 may provide the estimated operating parameter to a logic unit 418. If the logic unit 418 does not receive a feedback parameter from the feedback controller 414, the estimated operating parameter becomes the operating control parameter. The logic unit 418 may provide the operating control parameter to the PWM controller 416. Based on the operating control parameter, the PWM controller 416 may control switch drivers (not shown in FIG. 4A) to provide wireless power having one or more characteristics (such as a selected frequency).

In some instances (such as in response to a change in the load state, the reference voltage, or both), the TX controller 108 may determine a new estimated operating parameter or modify the existing estimated operating parameter based on feedback information received from the wireless power reception apparatus. In some implementations, the TX controller 108 may coordinate with the wireless power reception apparatus to synchronize a change to the estimated operating parameter (such as an increase in power) to cause synchronized transmission and consumption of the wireless power.

After providing power to the wireless power reception apparatus, the TX controller 108 may utilize feedback information received from the wireless power reception apparatus to adjust the estimated operating parameter or the operating control parameter. The TX controller 108 may utilize such feedback information to account for errors in the power estimate, errors in operating K-factor and differences in parameters between the operating wireless power transmission apparatus and reference wireless power transmission apparatus. When responding to a changed load state, the TX controller 108 may determine a new estimated operating parameter as described. The TX controller 108 also may determine a feedback parameter based on the feedback information received from the wireless power reception apparatus. To determine the feedback parameter, a comparator 420 or error computing unit may determine a difference between the reference voltage 408 and the load voltage 422. In some implementations, feedback information from the wireless power reception apparatus may indicate both the reference voltage 408 and the load voltage 422. The reference voltage 408 may indicate a voltage needed by the load, whereas the load voltage 422 may indicate a measured voltage that is available to the load. The comparator 420 may determine a load voltage error based on the reference voltage 408 and the load voltage 422. For example, the load voltage error may be a difference between the reference voltage 408 and the load voltage 422. The comparator 420 may provide the voltage error to the feedback controller 414. The feedback controller 414 may determine a feedback parameter based on the voltage error. The feedback parameter may be a value used to adjust the estimated operating parameter (which is provided by the estimator unit 412) based on the feedback information received from the wireless power reception apparatus.

In some implementations, the feedback controller can be implemented as a multiloop controller with an inner and an outer loop. The outer loop takes the voltage error as input and provides a reference to the inner loop as output. The inner loop can be based on controlling the current or power in the transmitter coil. For example, the outer loop can provide a reference power as its output and the inner loop can implement a power control to make the average transmitter power (computed based on the multiplication of inverter voltage and current, summing the product, and averaging the summed-products averaging the product over one half of AC cycle) equal to the reference power. The output of the inner loop may be the feedback parameter.

The feedback parameter may relate to frequency, duty cycle, voltage, or any other suitable characteristic of the wireless power. The feedback controller 414 may provide the feedback parameter to the logic unit 418. In some implementations, the estimated operating parameter has greater influence on the operating control parameter than does the feedback parameter.

The logic unit 418 can include one or more comparators, adders, subtractors, lookup tables and any other suitable logic for determining the operating control parameter. The logic unit 418 may receive the operating control parameter and the feedback parameter. The logic unit 418 may determine the operating control parameter based on the estimated operating parameter and the feedback parameter. The operating control parameter may indicate one or more of a frequency, duty cycle, voltage, power amount or other suitable characteristic of wireless power to be provided to the wireless power reception apparatus. In some implementations, the TX controller 108 may coordinate with the wireless power reception apparatus to synchronize transmission and consumption of the wireless power.

Figure 4B:
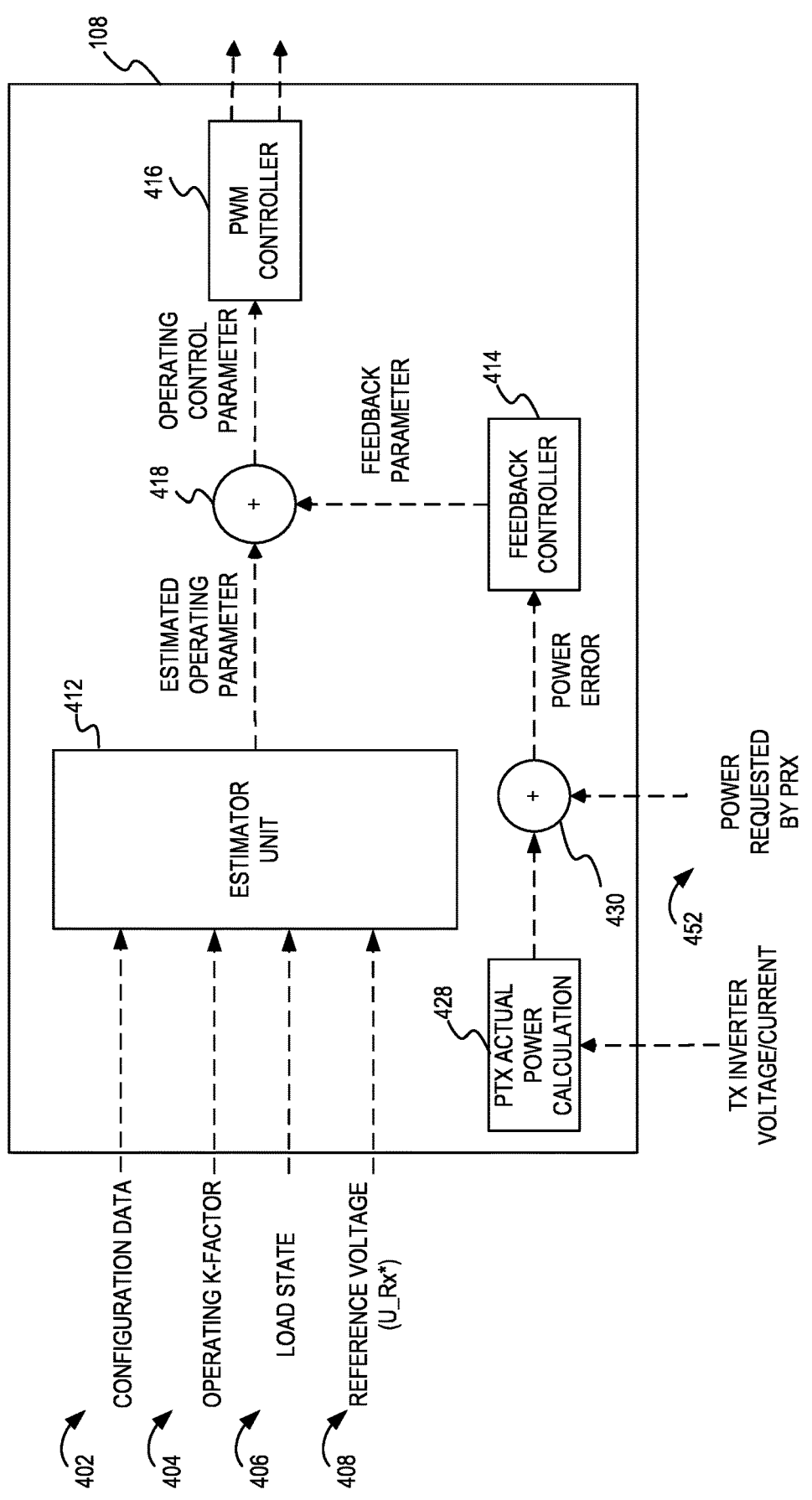
FIG. 4B shows a block diagram conceptually illustrating components of an example transmission controller using power control.
Figure 5:
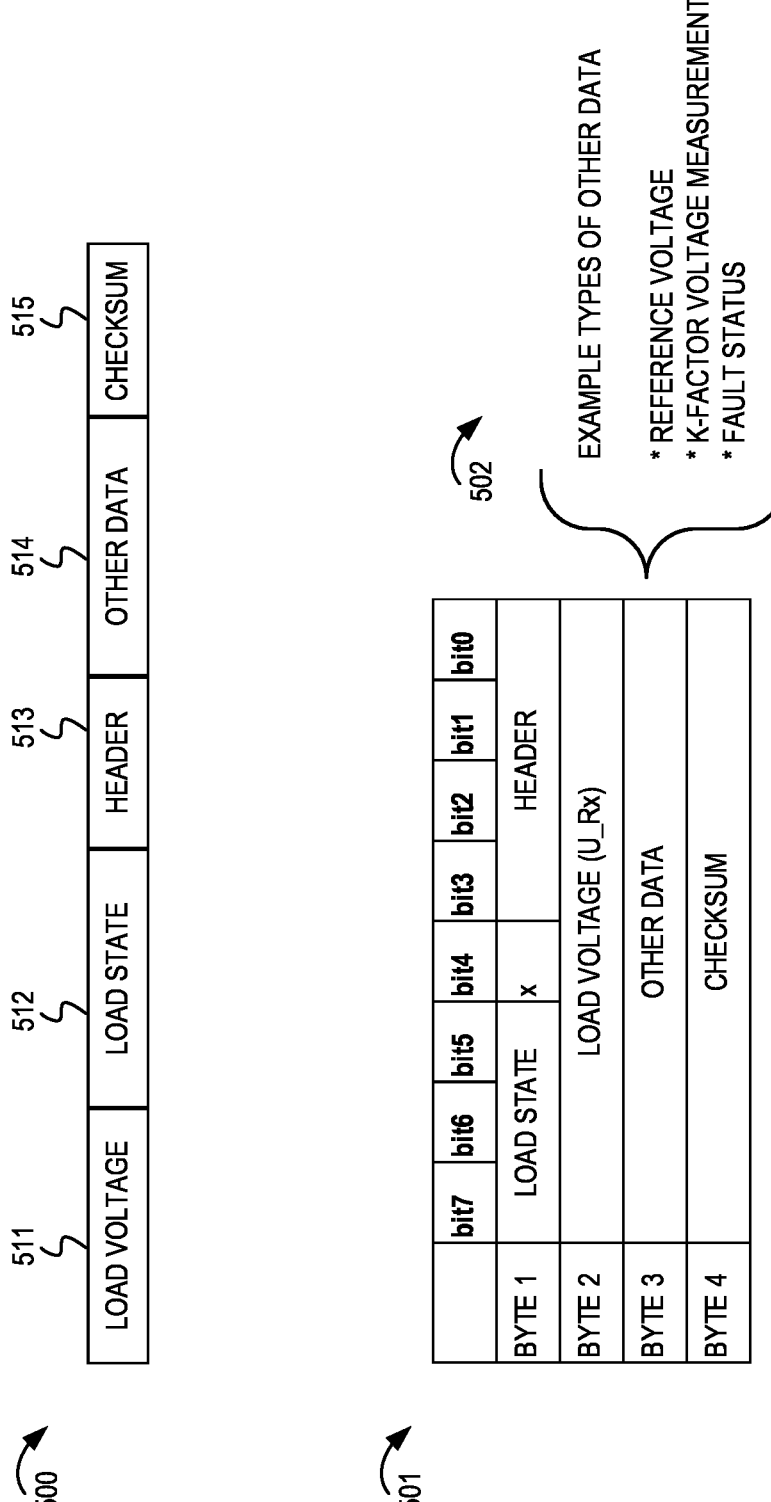
FIG. 5 shows a block diagram conceptually illustrating an example format of feedback information.

FIG. 4B shows a block diagram conceptually illustrating components of an example transmission controller using power control. The elements in FIG. 4B are the same as corresponding elements described with reference to FIG. 4A. However, FIG. 4B illustrates an example in which power control (rather than voltage control) is implemented. A wireless power reception apparatus may indicate an amount of power requested 452. The TX controller 108 may determine an actual power transmitted using a power calculation 428. The power calculation 428 may include multiplying the instantaneous inverter current and inverter voltage, summing the product, and averaging the summed products over one half of AC mains cycle to determine an average actual power transmitted. Meanwhile, the wireless power reception apparatus may send feedback information that indicates the amount of power requested 452. Logic unit 430 may compare the average actual power transmitted and the amount of power requested 452 to generate a power error value. The feedback controller 414 may determine the feedback parameter based on the power error value. FIG. 5 shows a block diagram conceptually illustrating an example format of feedback information. Feedback information 500 may include a load voltage 511, a load state 512, a header 513, other data 514, and a checksum 515. Some fields may be omitted in various implementations. In a traditional wireless power system, a wireless power reception apparatus may only send a load voltage error and may rely on the wireless power transmission apparatus to adjust its transmission power based solely on voltage error. However, in the dynamic control technique, such as those described herein, the feedback information may provide additional information enabling the wireless power reception apparatus to coordinate better with the wireless power transmission apparatus to control the transfer of wireless power needed by a variable load. For example, by indicating the load state 511, the wireless power reception apparatus can inform the wireless power transmission apparatus about a current operating state of the variable load. A load state 511 equal to a first value (such as zero) may indicate that the variable load is off or idle. A load state 511 equal to a second value (such as a non-zero value) may indicate a particular operation associated with the variable load. For example, the load state 511 may indicate an active state of the variable load. Furthermore, various values for the load state 511 may refer to a load setting of a blender. In another example, various values for the load state 511 may indicate whether a heating element, a fan, or both, of an air fryer are active. The load state 511 may correspond to a reference load state defined in the configuration data (not shown) previously sent from the wireless power reception apparatus to the wireless power transmission apparatus to enable the wireless power transmission apparatus to determine an estimated operating parameter.

In addition to the load voltage and load state, the feedback information 500 may include other data 514. A header 513 in the feedback information 500 may describe which type of data is included in the other data 514. FIG. 5 shows examples 502 of other data that could be included in feedback information. For example, the other data may include a reference voltage, a K-factor voltage measurement (such as the received voltage at the secondary coil during a K-factor determination process), a fault status, among other examples. A fault status may be included when there is a fault in the wireless power reception apparatus such as an open circuit, over voltage detection, over current detection, over temperature detection, under voltage detection, among other examples. Another example fault status may include an indication that the wireless power reception apparatus has detected a foreign object in the magnetic field between the wireless power transmission apparatus and the wireless power reception apparatus.

In some implementations, the feedback information 500 may be formatted as a feedback message. FIG. 5 illustrates an example format for a feedback message 501 that has a fixed length of four bytes. The load state may occupy 3 bits. A header may occupy 4 bits. Together, the load state, a reserved bit, and the header may occupy a first byte of the feedback message 501. The load voltage may be 8 bits and may occupy a second byte of the feedback message 501. The other data may be 8 bits and may occupy a third byte of the feedback message 501. The checksum may be 8 bits and may occupy a fourth byte of the feedback message 501. The bit lengths and locations of the various fields in the feedback message 501 are provided as examples and other suitable arrangements are possible. For example, the checksum may be omitted in some examples.

Figure 6:
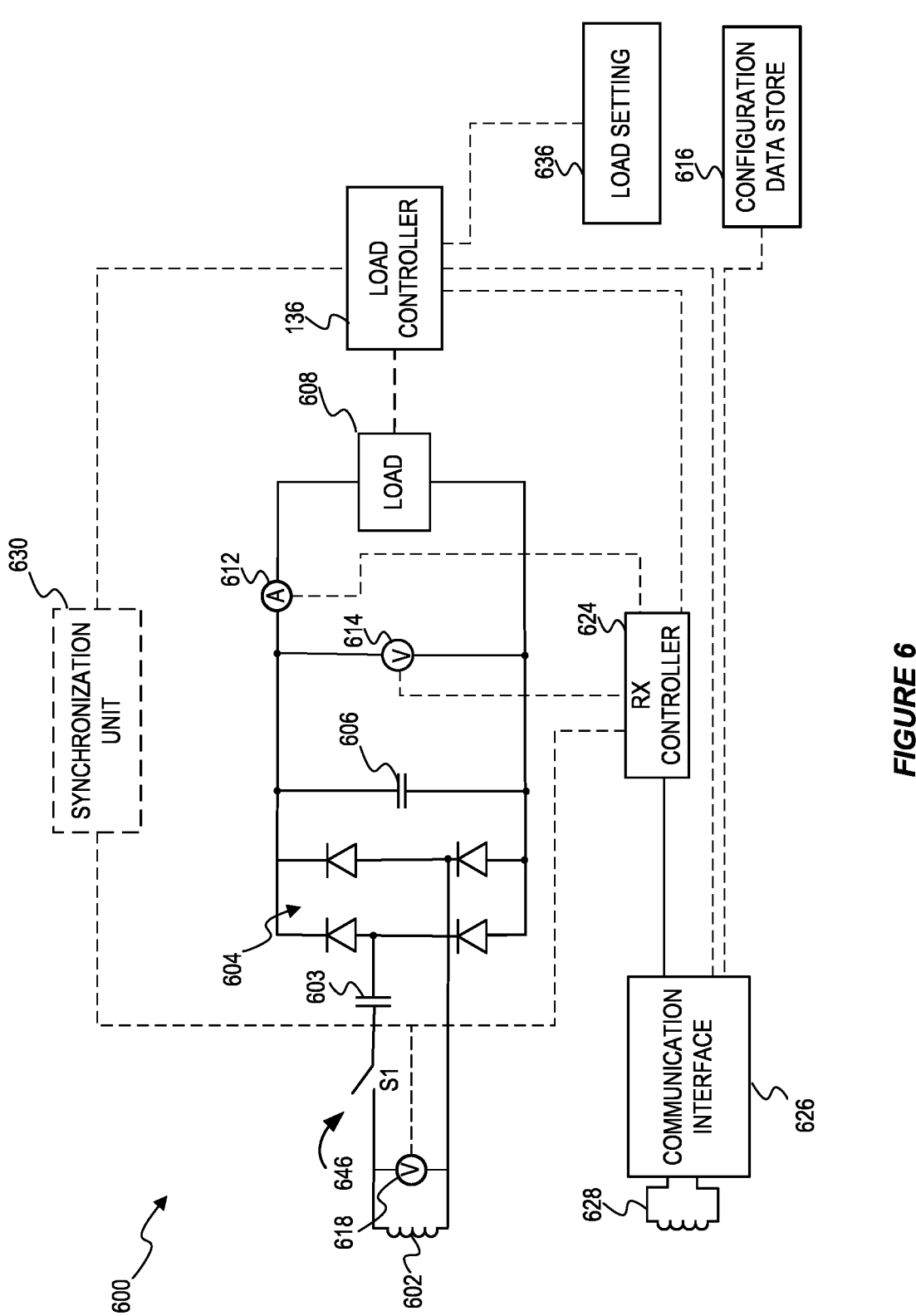
FIG. 6 shows a block diagram conceptually illustrating an example wireless power reception apparatus.

FIG. 6 shows a block diagram conceptually illustrating an example wireless power reception apparatus. In FIG. 6, a wireless power reception apparatus 600 includes a secondary coil 602. The secondary coil 602 may be connected to a series capacitor 603, an optional series switch 646, and a rectifier 604, which may be connected to a load 608. The rectifier 604 may be absent in some kinds of loads. The wireless power reception apparatus 600 also may include a communication interface 626, which may include a second communication coil 628. The communication interface 606 may be connected to an RX controller 624. The series switch

646 may be turned on once the handshake with the transmission apparatus is complete. The switch may also be used advantageously to determine the K-factor before initiating power transfer.

The RX controller 624 also may receive various information and transmit that information to a wireless power transmission apparatus via the communication interface 626. The RX controller 624 may receive wireless power reception apparatus data from a memory (shown as configuration data store 616). The configuration data may include any of the data described in Table 1. For example, the configuration data may include estimator data such as reference control parameters such as operating frequencies of the wireless power reception apparatus at different reference K-factors and reference load states of the wireless power reception apparatus obtained when the wireless power reception apparatus was tested on a reference wireless power transmission apparatus. The configuration data may be transmitted by the communication interface 626 to the wireless power transmission apparatus. The RX controller 624 also may receive information indicating load states and/or power estimates from the load controller 136. The RX controller 624 also may receive K-factor voltage measurement information from a first voltage sensor 618 that is connected to the secondary coil 602. The K-factor voltage measurement information may indicate a peak or root mean square (RMS) voltage at the secondary coil 602 measured during a K-factor determination process. The RX controller 624 also may receive load voltage information from a second voltage sensor 614 that is connected to the load 608. The load voltage information may indicate a voltage available to the load 608. The RX controller 624 also may receive information about current from a current sensor 612 connected to the rectifier 604. The information about current and voltage may indicate an amount of power available for the load 608.

At various times before, during, or after the transfer of wireless power, the communication interface 626 may transmit, to the wireless power transmission apparatus, the aforementioned configuration data, K-factor voltage measurement information, load voltage information, the load state, among other examples. The load controller 136 may control the load 608 according to a load setting 636. The load setting 636 may be a user-selectable setting, such as a temperature setting or motor speed setting. In some implementations, the load setting 636 may refer to a pattern of load states based on a user-selectable setting. For example, the load setting 636 may refer to a pattern of operations in an air fryer that at various times may operate a heating element, a fan, or both, to achieve a user-selectable setting.

In some instances, the RX controller 624 may transmit some or all of the configuration data to the transmission controller during a handshaking process, as described herein. In some instances, the RX controller 624 may transmit feedback information to a wireless power transmission apparatus. The feedback information may include one or more of a load state, a reference voltage, a power estimate or request for the load, the K-factor voltage measurement information, the load voltage information, a fault state, or any combination thereof. A TX controller (not shown) of the wireless power transmission apparatus may modify the wireless power being transmitted to the wireless power reception apparatus 600 based on the feedback information.

In some implementations, a synchronization unit 630 may be associated with the first voltage sensor 618. The synchronization unit 630 may determine a synchronization event and may provide a synchronization signal by which components can synchronize operations. For example, the synchronization unit 630 may determine a synchronization event indicating no switching in the wireless power transmission apparatus based on a time when the coil sensed voltage (at the first voltage sensor 618) is zero. The synchronization event detected by the synchronization unit 630 may be at substantially the same time as a corresponding synchronization event determined by a synchronization unit (not shown) of the wireless power transmission apparatus.

As described herein, the load controller 136 may synchronize operations of the load 608 with a change in an operating control parameter used by the wireless power transmission apparatus to transfer the wireless power. For example, the load controller 136 may wait for a synchronization event before configuring the load 608 according to a changed load state. For motor type loads, this may involve switching on/off relays/switches (not shown in FIG.) in the load 608.

Figure 7:
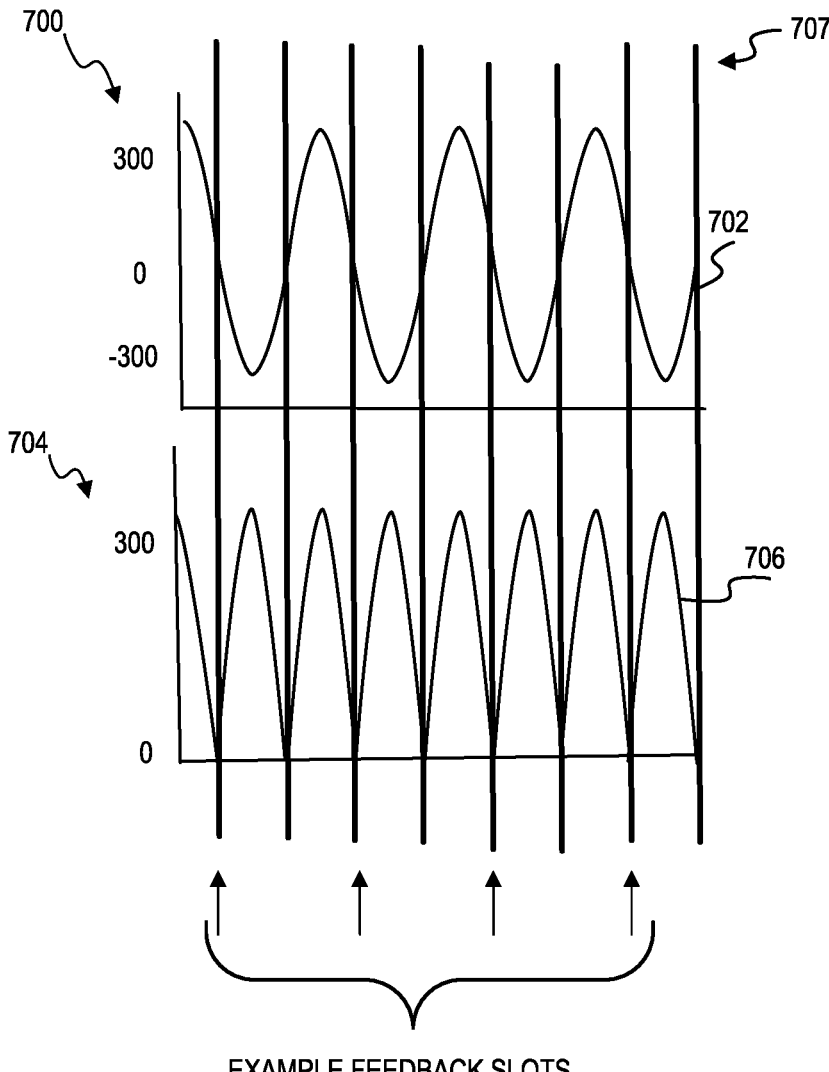
FIG. 7 illustrates example voltage curves to enable timing synchronization of operations between a wireless power transmission apparatus and a wireless power reception apparatus.

FIG. 7 illustrates example voltage curves to enable timing synchronization of operations between a wireless power transmission apparatus and a wireless power reception apparatus. In FIG. 7, an AC voltage graph 700 shows an AC voltage curve 702. The AC voltage curve 702 may represent an AC voltage from the main terminals feeding the wireless power transmission apparatus (referred to herein as AC mains or AC mains voltage). For illustration, the AC mains frequency may be 50 Hz. In FIG. 7, a DC voltage graph 704 shows a DC voltage curve 706. The DC voltage curve 706 may represent a rectified voltage available after the rectifier in the wireless power transmission apparatus. The DC voltage curve 706 also may represent an output of a smaller rectifier feeding off the AC mains and connecting to a voltage sensor and/or bias power unit that provides power to the electronics in the wireless power transmission apparatus. The lines 707 indicate points at which the AC voltage curve 702 and the DC voltage curve 706 simultaneously have a voltage of (V (also referred to as a zero voltage or zero cross event).

The wireless power transmission apparatus may include a synchronization unit that may provide a signal representing the AC voltage curve 702 or the rectified DC voltage curve 706 to the TX controller 108. Near every point at which the AC mains voltage is zero (also referred to as a zero crossing), the TX controller 108 may stop power transfer for a short time (such as approximately 300 micro seconds, approximately one millisecond, or any other suitable time period) by disabling a PWM driver to create time slots for other operations. Other operations may include data communication between the wireless power transmission apparatus and the wireless power reception apparatus using NFC, a K-factor determination process, or foreign object detection (FOD) operations. In some implementations, an absence of power transfer to the wireless power transmission apparatus during these instances may serve as a clock to the wireless power reception apparatus to synchronize its operation with the wireless power transmission apparatus. Hence, the wireless power transmission apparatus can synchronously cooperate with the wireless power reception apparatus.

In some implementations, the zero cross events illustrated as lines 707 are designated a regularly recurring feedback slots, FOD slots, or K-factor determination slots. For example, the feedback slots may occur every 20 ms. The remaining zero cross events may be designated for FOD operations or K-factor determination processes.

Figure 8:
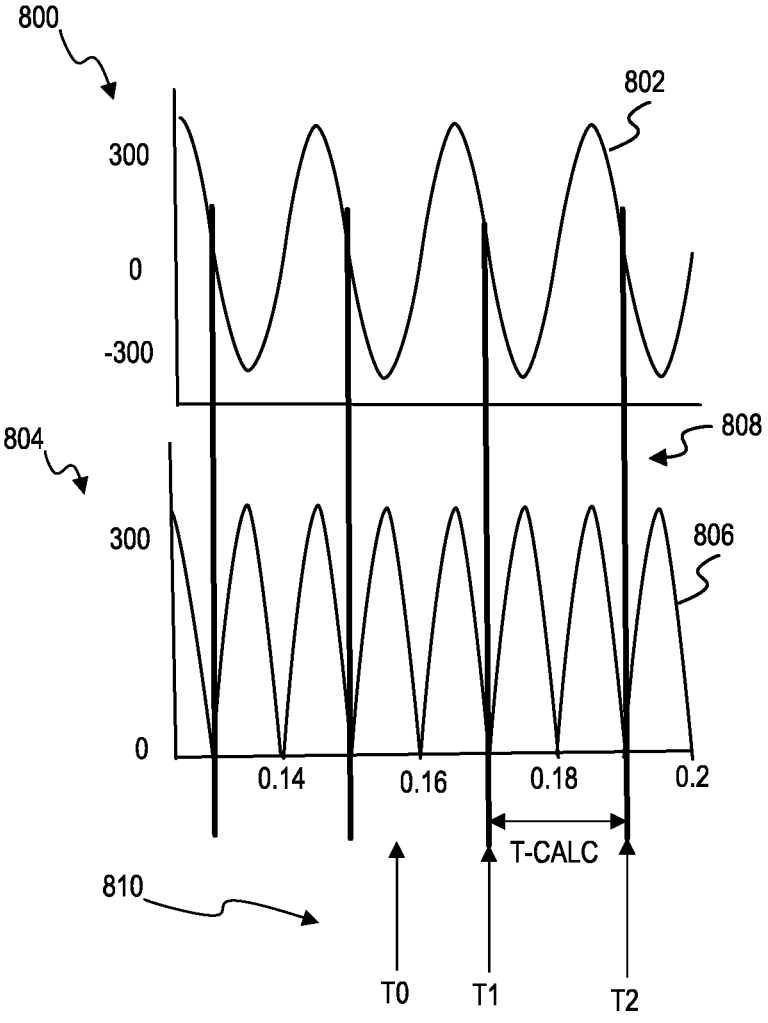
FIG. 8 illustrates example voltage curves with which a transmission controller of a wireless power transmission apparatus may synchronize with a load controller of a wireless power reception apparatus.

FIG. 8 illustrates example voltage curves with which a transmission controller of a wireless power transmission apparatus may synchronize with a load controller of a wireless power reception apparatus. More specifically, a TX controller 108 of a wireless power transmission apparatus and a load controller 136 of a wireless power reception apparatus may cooperate to synchronize their respective power operations. For example, when providing power to the wireless power reception apparatus, the TX controller 108 may wait for a synchronization event before commencing transmission of the power. The synchronization event may be the next point at which the AC voltage curve 802 has zero voltage. In response to the synchronization event (such as the next instance of zero voltage), the TX controller 108 may commence transmission of wireless power based on an operating control parameter (as described with reference to FIG. 4A or 4B). Similarly, the load controller 136 also may wait for the synchronization event before configuring a change in load to consume the changed power. In some instances, the TX controller 108 may substantially simultaneously commence wireless power transmission when the load controller 136 configures the load to commence consumption of the wireless power.

FIG. 8 includes temporal markers 810 indicating events in a wireless power system. More specifically, the temporal markers 810 indicate events arising when a load state changes. At time=T0, a load controller 136 may detect a change to a load state. For example, the load state change could be initiated by a user changing a knob or other setting in an appliance. In some implementations, communications may occur synchronously upon every second zero voltage. At time=T1, when the power transfer is disabled by the TX controller 108, the load controller 136 may communicate the changed load state to the TX controller 108. Instead of immediately configuring the load to accommodate the load state, the load controller 136 may wait for a synchronization event before configuring the load.

Also at time=T1 (or substantially when time=T1), the TX controller 108 may receive the load state from the load controller 136.

In the duration between time=T1 and time=T2, the TX controller 108 may determine a new operating control parameter (for example, as described with respect to FIG. 4A or 4B). Instead of immediately commencing transmission of wireless power based on the new operating control parameter, the TX controller 108 may wait for a synchronization event.

At T2, there is a zero voltage for the AC voltage curve 802 and for the DC voltage curve 806, during which power transfer is disabled by the TX controller 108. The synchronization event is detected at both the wireless power transmission apparatus (such as by the TX controller 108) and the wireless power reception apparatus (such as by the RX controller 128 or the load controller 136). In response to the synchronization event, the TX controller 108 begins providing wireless power according to the new operating control parameter, and the load controller 136 configures the load to the changed load state. When the switching is resumed by the TX controller 108, power transfer to the changed load state may resume according to the new operating control parameter (such as frequency duty cycle, voltage, etc.).

Figure 9:
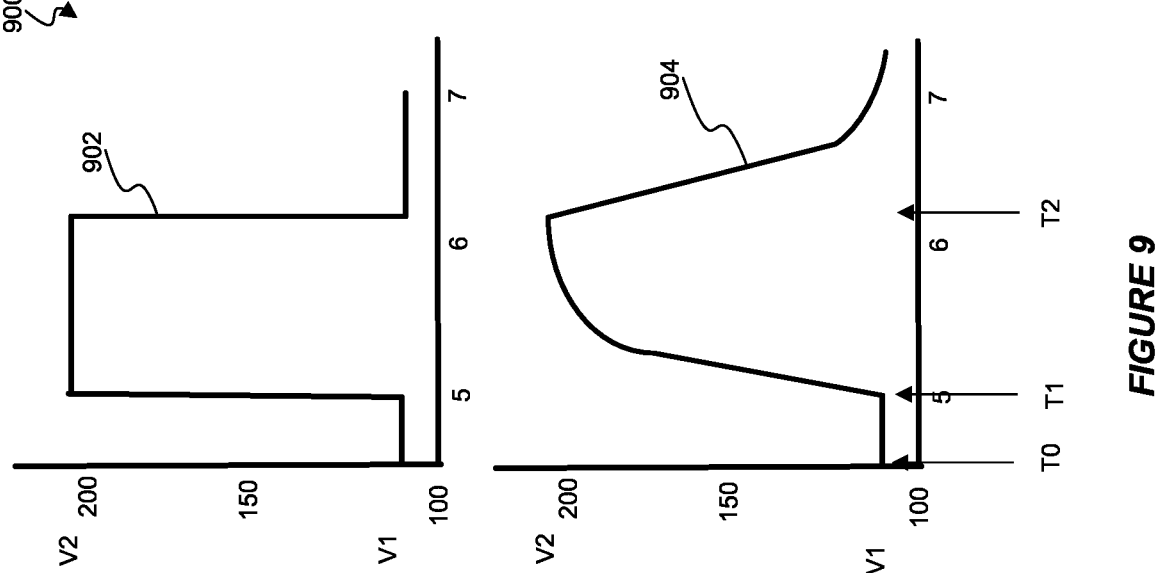
FIG. 9 illustrates example voltage graphs associated with a wireless power system implementing a traditional feedback control technique.

FIG. 9 illustrates example voltage graphs 900 associated with a wireless power system implementing a traditional feedback control technique. A first graph includes a reference load voltage curve 902 representing a desired load voltage in a wireless power reception apparatus. A second graph includes an actual load voltage curve 904 representing an average value of a load voltage sensed at the load of the wireless power reception apparatus. These graphs represent voltages in a traditional wireless kitchen system (such as a heating appliance) that does not have the benefit of this disclosure. The traditional wireless kitchen system may use a traditional feedback control technique in which changes in wireless power transmission is controlled by a feedback message from the wireless power reception apparatus to the wireless power transmission apparatus after a change in a load state of the wireless power reception apparatus. The actual load voltage curve 904 shows a delayed response in the power provided to the load. At a first point in time (shown as T0), power is flowing in the wireless power reception apparatus at a first load voltage (V1). At a second point in time (shown as T1), the power setting of the appliance is increased. Based on the new power setting, the reference load voltage curve 902 changes from V1 to a second load voltage (V2). The traditional feedback control technique may include a feedback message to indicate that the reference load voltage has changed to V2. However, the load may begin drawing power for the second load voltage immediately even though the wireless power transmission apparatus has not yet determined a new operating control parameter based on the new reference load voltage. Thus, after an increase in reference load voltage 902 from V1 to V2 at T1, the actual load voltage curve 904 may take significant time to reach the new steady state value of V2. As shown in the graphs 900, the actual load voltage curve 904 shows a sloped curve with delayed response after T1. At the third point in time (shown as T2), the power setting is decreased to indicate a decrease in reference load voltage setting from V2 to V1. Similar to the delayed response to the increase in reference load voltage, after the reduction in reference load voltage from V2 to V1 at T2, the average load voltage (represented by the actual load voltage curve 904) may take significant time to reach the new steady state value.

Figure 10:
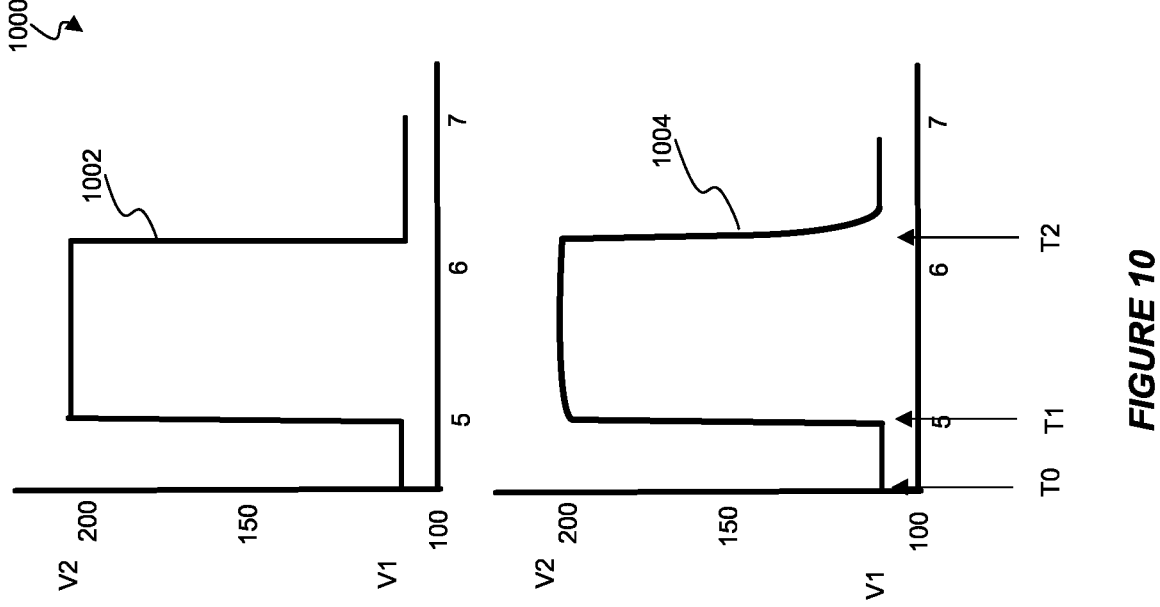
FIG. 10 illustrates example voltage graphs associated with a wireless power system that implements power control according to some implementations of this disclosure.

FIG. 10 illustrates example graphs 1000 associated with a wireless power reception system that implements power control according to some implementations of this disclosure. A first graph includes a reference load voltage curve 1002 representing a desired load voltage in the wireless power reception apparatus. Changes in load voltage at T1 and T2 and the corresponding reference load voltage curve 1002 in FIG. 10 is the same as the reference load voltage curve 1002 described with reference to FIG. 9. A second graph includes an actual load voltage curve 1004 representing an average value of the load voltage sensed at the load of the wireless power reception apparatus. In contrast to FIG. 9, the average value of the load voltage represented by the actual load voltage curve 1004 in FIG. 10 shows how the load voltage may be influenced by operations of a load controller 136 and a TX controller 108 described herein. When the power is increased (at T1) by a change in reference load voltage from V1 to V2, the average value of the load voltage (represented by the actual load voltage curve 1004) shows settling to the load state value of V2 in a relatively short time. Similarly, at T2, where the load state is reduced by a reduction in reference voltage from V2 to V1, the average load voltage settles to V1 in a relatively short time. The TX controller 108 may determine a new operating control parameter based on a change in load state voltage, resulting in faster transient behavior. As shown, the functionality and components described herein may increase responsiveness to power changes and may enhance user experience.

FIG. 11 shows a flow diagram illustrating example operations of a process for providing wireless power to a wireless power reception apparatus. For brevity, the operations are described as performed by an apparatus. The operations of the process 1100 may be implemented by a wireless power transmission apparatus as described herein. For example, the process 1100 may be performed by the wireless power transmission apparatus 102 and the TX controller 108 described with reference to FIG. 1, the wireless power transmission apparatus 300 and TX controller 108 described with reference to FIG. 3, the TX controller 108 described with reference to FIG. 4A or 4B or the apparatus 1700 described with reference to FIG. 19.

At block 1102, the apparatus may obtain configuration data, a load state, and a reference voltage associated with a variable load of a wireless power reception apparatus.

At block 1104, the apparatus may initiate a transmission of wireless power to the wireless power reception apparatus using an operating control parameter that is based, at least in part, on the configuration data, the load state, and the reference voltage.

At block 1106, the apparatus may receive feedback information from the wireless power reception apparatus during the transmission of the wireless power, the feedback information including a load voltage measured by the wireless power reception apparatus and further indicating a change to the load state, the reference voltage, or both.

At block 1108, the apparatus may modify the operating control parameter based, at least in part, on the feedback information.

FIG. 12 shows a flow diagram illustrating example operations of a process for receiving wireless power in a wireless power reception apparatus. For brevity, the operations are described as performed by an apparatus. The operations of the process 1200 may be implemented by a wireless power reception apparatus as described herein. For example, the process 1200 may be performed by a wireless power reception apparatus 118 and the load controller 136 described with reference to FIG. 1 and the wireless power reception apparatus 600 described with reference to FIG. 6.

At block 1202, the apparatus may transmit, to a wireless power transmission apparatus, configuration data, a load state, and a reference voltage associated with a variable load of the wireless power reception apparatus.

At block 1204, the apparatus may receive wireless power from the wireless power transmission apparatus that is based, at least in part, on the configuration data, the load state, and the reference voltage.

At block 1206, the apparatus may transmit feedback information to the wireless power transmission apparatus during reception of the wireless power, the feedback information including a load voltage measured by the wireless power reception apparatus and further indicating a change to the load state, the reference voltage, or both.

Figure 13:
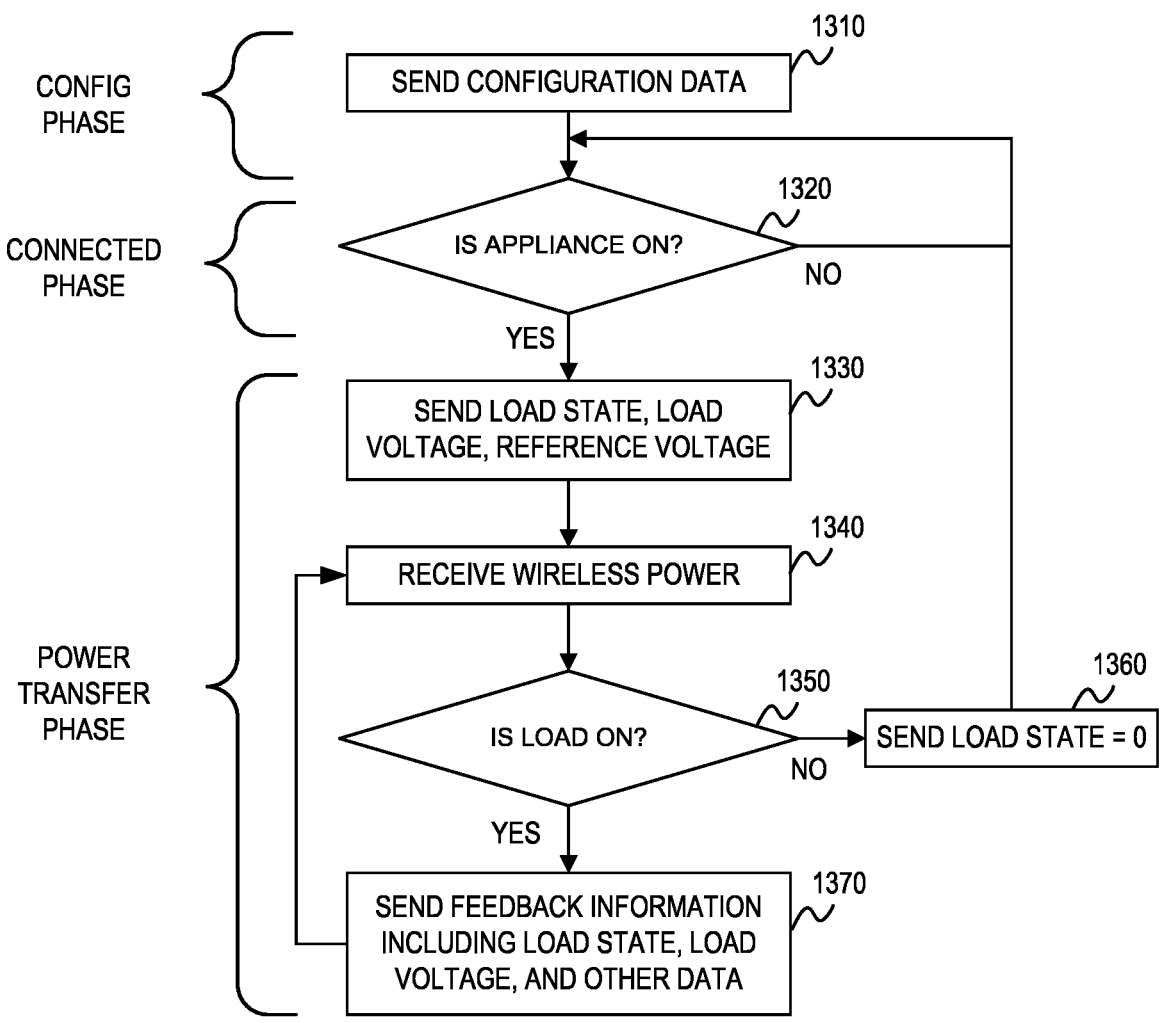
FIG. 13 shows a flow diagram illustrating example operations of a process in an example wireless power reception apparatus having a motor with section windings.

FIG. 13 shows a flow diagram illustrating example operations of a process in an example wireless power reception apparatus having a motor with section windings. For brevity, the operations are described as performed by an apparatus. The operations of the process 1200 may be implemented by a wireless power reception apparatus as described herein. For example, the process 1200 may be performed by a wireless power reception apparatus 118 and the load controller 136 described with reference to FIG. 1 and the wireless power reception apparatus 600 described with reference to FIG. 6.

At block 1310, during a configuration phase, the apparatus may send configuration data to a wireless power transmission apparatus. Table 3 shows an example of configuration data that a wireless power reception apparatus having a motor with section windings may send. Note that the example configuration data includes a starting control parameter and a control parameter limit, but may not include estimator data.

26

TABLE 3

| Example configuration data | | |
| --- | --- | --- |
| Description | Symbol/Data | values |
| Control type | C | 2 |
| Rated appliance voltage | Urx | 230 |
| Rated appliance power | PRx | 550 |
| Receiver coil distance from interface surface | Zs | 10 |
| Receiver coil turns | N2 | 40 |
| Receiver coil free air inductance | Ls | 263 |
| Receiver resonance capacitance | Cs | 100 |
| Estimator data size | Est_data_size | 0 |
| Starting control parameter (e.g., starting frequency) | Fstart | 50 |
| Control parameter limit (e.g., frequency limit) | Flimit | 30 |

Following the configuration phase, the wireless power reception apparatus may enter a connected phase. At block 1320, the apparatus may determine whether the appliance is on. For example, the appliance may be turned on with minimal power to enable a user to select a user-selectable setting or to enable the appliance to activate the motor. If the appliance is off, the process may remain in the connected phase without sending feedback information to the wireless power transmission apparatus. Alternatively, or additionally, the apparatus may send periodic feedback indicating the load state is idle or off (such as load state=0). However, if the appliance is on, the process may continue to the power transfer phase beginning with block 1330.

At block 1330, the apparatus may send a load state, load voltage, and reference voltage to the wireless power transmission apparatus. The wireless power transmission apparatus will use these values to determine an operating control parameter and begin the transmission of wireless power to support the load. In some implementations, the transmission of wireless power will begin in synchronization with a load controller of the apparatus activating the load.

At block 1340, the apparatus may receive wireless power and use it to power the load.

At block 1350, the apparatus may determine whether the load is still on or has been switched off. For example, a user may turn off the motor or change a setting to discontinue the power to the motor resulting in a determination that the load is no longer on. In that case, the process continues to block 1360 in which the apparatus sends feedback information indicating the load state is idle of off (such as load state=0). If the load is still on, the process may continue to block 1370, in which the send feedback information indicating the load state, the load voltage and other data. The other data may include, for example, a reference voltage that enables the wireless power transmission apparatus to calculate a voltage error and adjust the operating control parameter to meet the reference voltage. The process may return to block 1430 in which the apparatus continues to receive wireless power and use it to power the load.

Figure 14:
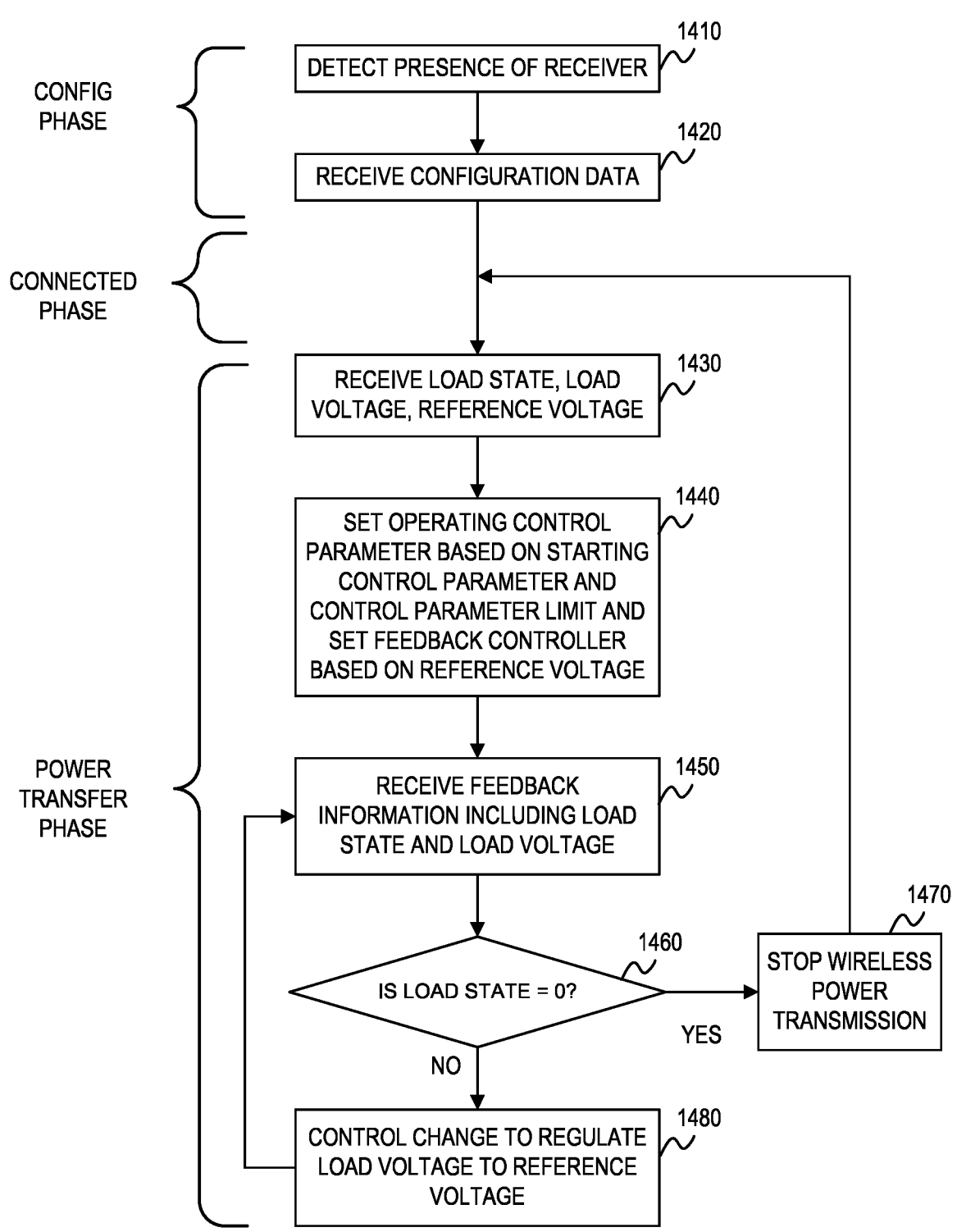
FIG. 14 shows a flow diagram illustrating example operations of a process in an example wireless power transmission apparatus for transmitting wireless power corresponding to the process described with reference to FIG. 13.

FIG. 14 shows a flow diagram illustrating example operations of a process in an example wireless power transmission apparatus for transmitting wireless power corresponding to the process described with reference to FIG. 13. For brevity, the operations are described as performed by an apparatus. The operations of the process 1100 may be implemented by a wireless power transmission apparatus as described herein. For example, the process 1100 may be performed by the wireless power transmission apparatus 102 and the TX controller 108 described with reference to FIG. 1, the wireless power transmission apparatus 300 and TX controller 108 described with reference to FIG. 3, the TX controller 108 described with reference to FIG. 4A or 4B or the apparatus 1700 described with reference to FIG. 19.

At block 1410, the apparatus may detect the presence of a wireless power reception apparatus. At block 1420, in the configuration phase, the apparatus may receive configuration data (such as the example configuration data in Table 3). After communicating the configuration data, the wireless power transmission apparatus and the wireless power reception apparatus may be in a connected phase. The connected phase may include time when the wireless power reception apparatus is idle. Moving to the power transfer phase, at block 1430, the apparatus may receive a load state, load voltage, and reference voltage from the wireless power reception apparatus.

At block 1440, in the power transfer phase, the apparatus may set an operating control parameter based on the configuration data. For example, the apparatus may set the operating control parameter as the starting control parameter and may control the operating control parameter such that it does not violate the control parameter limit. The apparatus also may record the reference voltage such that it can be used for ongoing calculation of the voltage error.

At block 1450, the apparatus may receive feedback information including the load state and the load voltage. In some implementations, the feedback information also may include a change to the reference voltage.

At block 1460, the apparatus may determine whether the load state included in the feedback information indicates that the load is off. For example, when the load state=0, the apparatus may determine that the load is off and may proceed to block 1470 to stop the wireless power transmission. Thereafter, the apparatus may return to the connected phase to wait for a further message indicating a change to the load state or to an idle state if the appliance is removed from the interface surface. However, if at block 1460, the apparatus determines that the load state is not 0, the process may continue to block 1480.

At block 1480, the apparatus may regulate the control of wireless power based on the load voltage and the reference voltage. For example, the apparatus may determine a feedback parameter to adjust the operating control parameter to accommodate for a difference between the load voltage and the reference voltage. After 1480, the process will loop back to block 1450.

Figure 15:
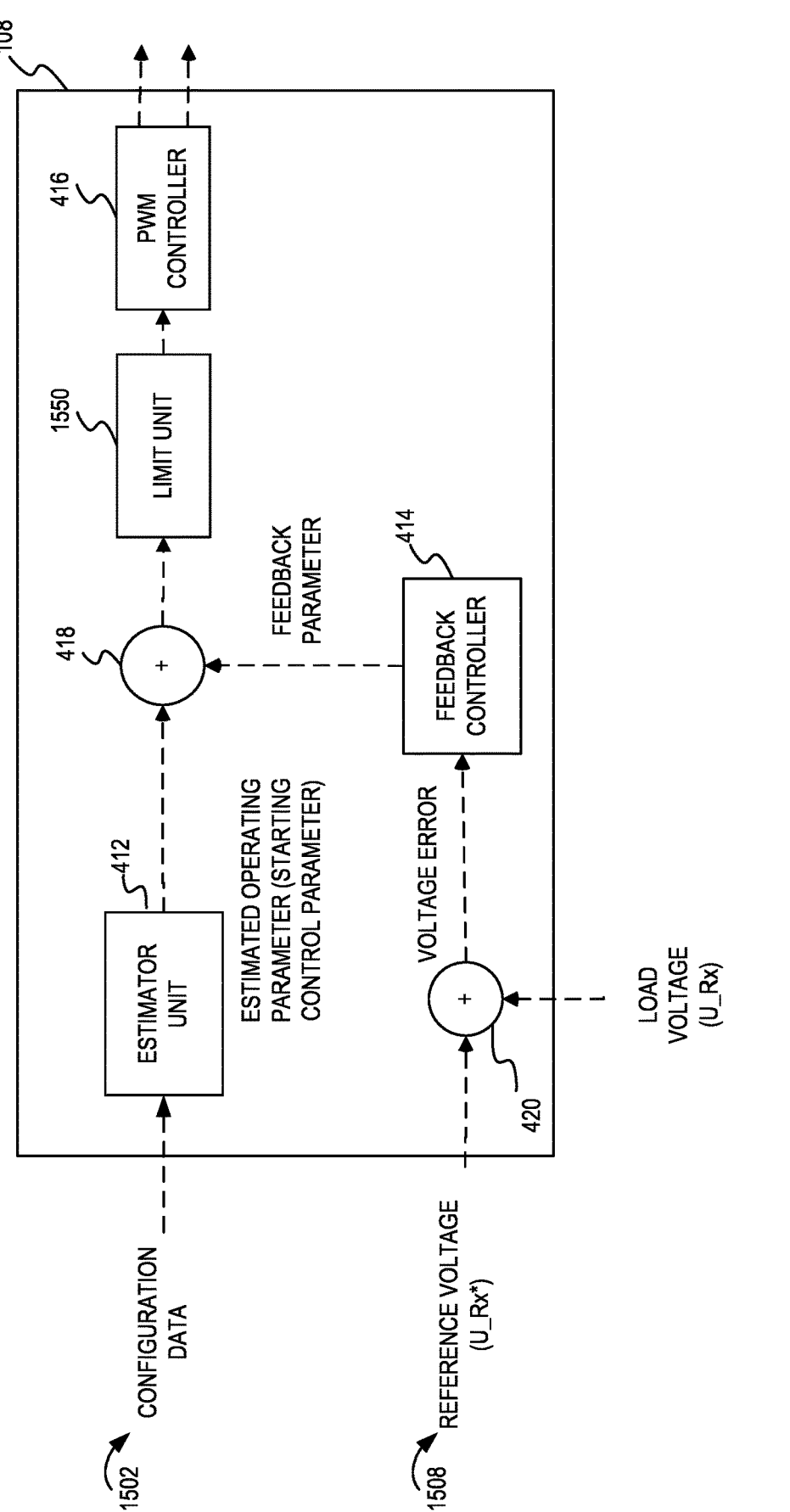
FIG. 15 shows a block diagram illustrating power control operations an example wireless power transmission apparatus corresponding to the process described with reference to FIG. 14.

FIG. 15 shows a block diagram illustrating power control operations an example wireless power transmission apparatus corresponding to the process described with reference to FIG. 14. The blocks in FIG. 15 are equivalent to the corresponding blocks described with reference to FIG. 4A or 4B. In this situation because the configuration data does not include estimator data, the estimator unit 412 may use the starting control parameter (such as Fstart) as the estimated operating parameter. The control parameter limit may be enforced by a limit unit 1550. Using the example configuration data from Table 3, the starting control parameter (and thus, the estimated operating parameter) may be a starting frequency of 50 kilohertz (kHz). In some implementations, the estimated operating parameter may be adjusted based on the reference voltage 1508 or based on characteristics of the wireless power transmission apparatus. The limit unit 1550 may ensure that the operating control parameter from logic unit 418 does not fall below the Flimit of 30 kHz indicated in the example configuration data. The limit unit 1550 may also integrate controls that avoid overvoltage and overcurrent situations in the transmitter.

Figure 16:
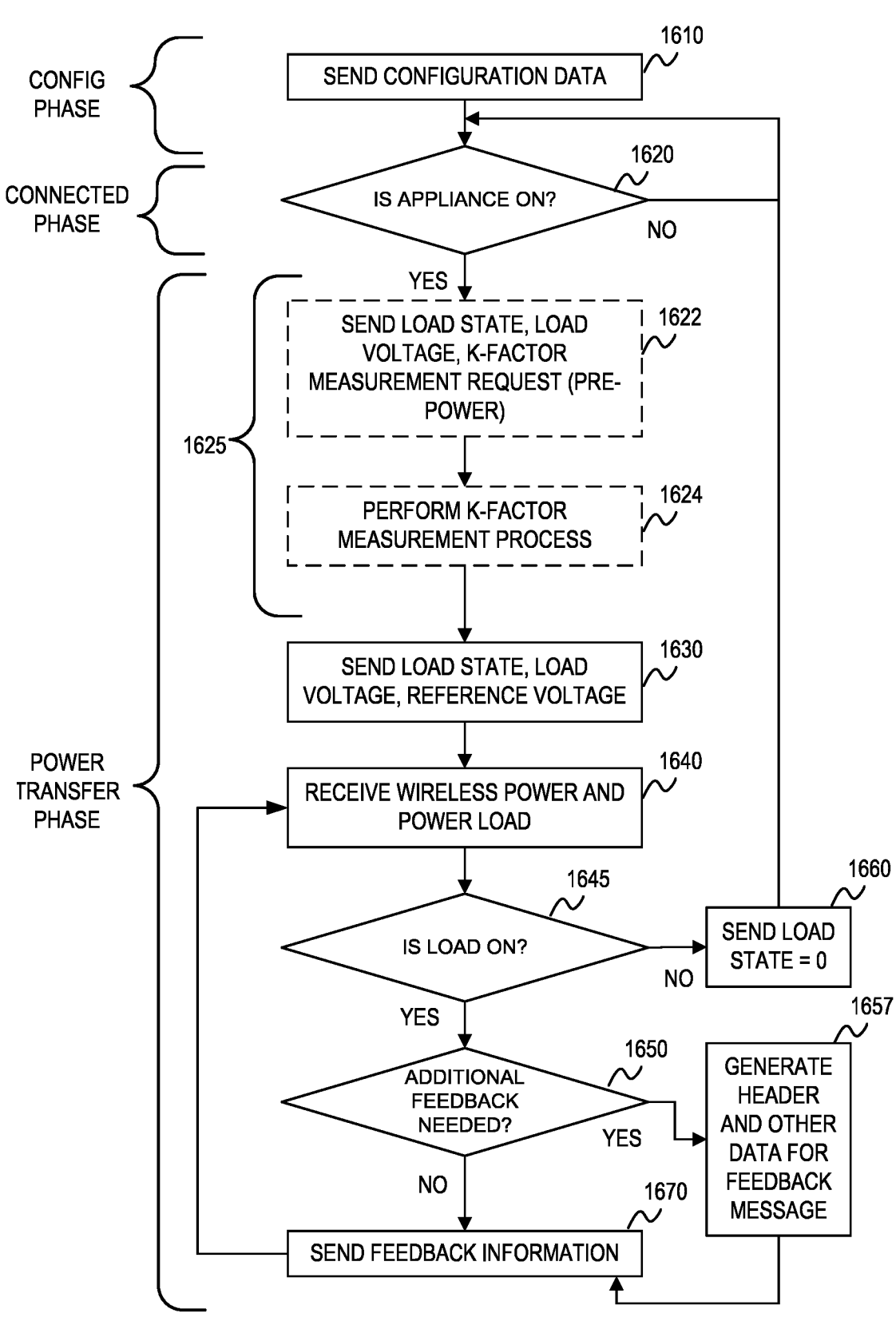
FIG. 16 shows a flow diagram illustrating example operations of a process in an example wireless power reception apparatus associated with an air fryer.

FIG. 16 shows a flow diagram illustrating example operations of a process in an example wireless power reception apparatus associated with an air fryer. For brevity, the operations are described as performed by an apparatus. The operations of the process 1200 may be implemented by a wireless power reception apparatus as described herein. For example, the process 1200 may be performed by a wireless power reception apparatus 118 and the load controller 136 described with reference to FIG. 1 and the wireless power reception apparatus 600 described with reference to FIG. 6.

At block 1610, during a configuration phase, the apparatus may send configuration data to a wireless power transmission apparatus. Table 4 shows an example of configuration data that a wireless power reception apparatus associated with an air fryer. Note that the example configuration data includes estimator data but may not include a starting control parameter and a control parameter limit. Table 5 shows example estimator data. The reference K-factors (represented as decimals here) may be scaled appropriately to 5-bit binary representations.

TABLE 4

| Example configuration data | | |
|---|---|---|
| Description | Symbol/Data | values |
| Control type | C | 2 |
| Rated appliance voltage | Urx | 230 |
| Rated appliance power | PRx | 550 |
| Receiver coil distance from interface surface | Zs | 10 |
| Receiver coil turns | N2 | 40 |
| Receiver coil free air inductance | Ls | 263 |
| Receiver resonance capacitance | Cs | 100 |
| Estimator data size | Est_data_size | 4(=8 bytes) |
| Reference PTx used for estimator data | 1, 2 | 1 |

TABLE 5

| Example estimator data | | |
|---|---|---|
| Reference load state | Reference K-factor | Reference control parameter (recommended operating frequency parameter) |
| 1 (heater + fan) | 0.7 | 45 |
| 1 (heater + fan) | 0.2 | 35 |
| 2 (fan alone) | 0.7 | 50 |
| 2 (fan alone) | 0.2 | 47 |

Following the configuration phase, the wireless power reception apparatus may enter a connected phase. At block 1620, the apparatus may determine whether the appliance is on. If the appliance is off, the process may remain in the connected phase without sending feedback information to the wireless power transmission apparatus. Alternatively, or additionally, the apparatus may send periodic feedback indicating the load state is idle or off (such as load state=0). However, if the appliance is on, the process may continue to the power transfer phase beginning with block 1622.

Blocks 1622 and 1624 illustrate a K-factor determination process 1625 that may be performed prior to initiating power transfer or during a K-factor determination time slot. At block 1622, the wireless power reception apparatus may send a message indicating the K-factor measurement request. If the message is formatted according to a feedback message, the feedback message also may include the load state and load voltage. At block 1624, the apparatus may perform the K-factor determination process. The K-factor determination process may include measuring a received voltage (referred to as a K-factor voltage measurement) across a secondary coil at a time when no current is passing through the secondary coil. The K-factor determination process may include the appliance sending the K-factor voltage measurement to the wireless power transmission apparatus.

At block 1630, the apparatus may send a load state, load voltage, and reference voltage to the wireless power transmission apparatus. The wireless power transmission apparatus will use these values to determine an operating control parameter and begin the transmission of wireless power to support the load. In some implementations, the transmission of wireless power will begin in synchronization with a load controller of the apparatus activating the load.

At block 1640, the apparatus may receive wireless power and use it to power the load.

At block 1645, the apparatus may determine whether the load is still on or has been switched off. For example, a user may turn off the motor or change a setting to discontinue the power to the motor resulting in a determination that the load is no longer on. In that case, the process continues to block 1660 in which the apparatus sends feedback information indicating the load state is idle of off (such as load state=0)). If the load is still on, the process may continue to block 1650.

At block 1650, the apparatus may determine whether an additional feedback message is needed. For example, the additional feedback message may be needed if the load state has changed or if the reference voltage has changed. If an additional feedback message is needed, the process may continue to block 1657. In block 1657, the apparatus may prepare a header field and corresponding data for the feedback message. The process may continue to block 1670. Otherwise, if additional feedback is not needed at block 1650, the process may continue to block 1670. In block 1670, the apparatus sends the feedback information with the load state and load voltage. The feedback information also may include the header, and corresponding data, if generated, from block 1657.

FIG. 17 shows a flow diagram illustrating example operations of a process in an example wireless power transmission apparatus for transmitting wireless power corresponding to the process described with reference to FIG. 16.

At block 1710, the apparatus may detect the presence of a wireless power reception apparatus. At block 1720, in the configuration phase, the apparatus may receive configuration data (such as the example configuration data in Table 3). After communicating the configuration data, the wireless power transmission apparatus and the wireless power reception apparatus may be in a connected phase. The connected phase may include time when the wireless power reception apparatus is idle. Moving to the power transfer phase, the apparatus may perform a K-factor determination process 1725.

Blocks 1722 and 1724 illustrate a K-factor determination process 1725 that may be performed prior to initiating power transfer or during a K-factor determination time slot. At block 1722, the apparatus may receive a message indicating the K-factor measurement request. If the message is formatted according to a feedback message, the feedback message also may include the load state and load voltage. At block 1724, the apparatus may perform the K-factor determination process. The K-factor determination process may include applying a transmitted voltage across a primary coil. The K-factor determination process may include the apparatus receiving a K-factor voltage measurement from the wireless power reception apparatus. The apparatus may calculate the operating K-factor based on the transmitted voltage and the K-factor voltage measurement.

At block 1730, the apparatus may receive a load state, load voltage, and reference voltage from the wireless power reception apparatus.

At block 1740, in the power transfer phase, the apparatus may set an operating control parameter based on the configuration data. For example, the apparatus may determine an estimated operating parameter based on the estimator data, operating K-factor and load state. The apparatus also may set the reference voltage such that it can be used for ongoing calculation of the voltage error.

At block 1750, the apparatus may receive feedback information including the load state and the load voltage. In some implementations, the feedback information also may include a change to the reference voltage.

At block 1760, the apparatus may determine whether the load state included in the feedback information indicates that the load is off. For example, when the load state=0), the apparatus may determine that the load is off and may proceed to block 1770 to stop the wireless power transmission. Thereafter, the apparatus may return to the connected phase to wait for a further message indicating a change to the load state. However, if at block 1760, the apparatus determines that the load state is not 0, the process may continue to block 1780.

At block 1780, the apparatus may regulate the control of wireless power based on the load voltage and the reference voltage. For example, the apparatus may determine a feedback parameter to adjust the operating control parameter to accommodate for a difference between the load voltage and the reference voltage. In some implementations, the apparatus may modify the operating control parameter, such as when the load state or operating K-factor has changed. For example, the apparatus may determine a new estimated operating parameter based on the changed load state or changed operating K-factor. From the estimated operating parameter, the apparatus may determine the operating control parameter and adjust it as needed based on the reference voltage. From 1780, the process will loop back to step 1750.

Figure 18:
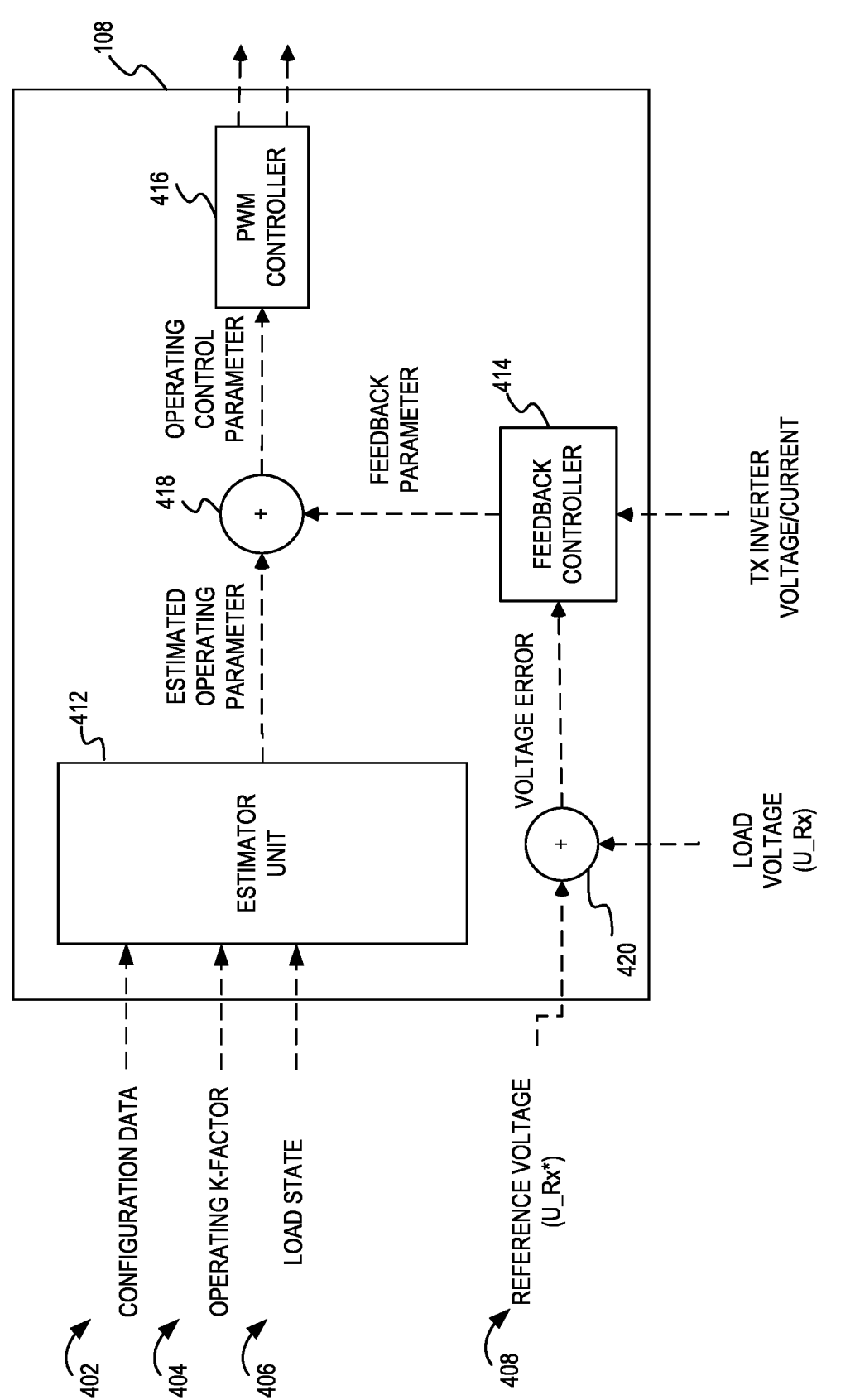
FIG. 18 shows a block diagram illustrating power control operations an example wireless power transmission apparatus corresponding to the process described with reference to FIG. 17.

FIG. 18 shows a block diagram illustrating power control operations an example wireless power transmission apparatus corresponding to the process described with reference to FIG. 17. The blocks in FIG. 18 are equivalent to the corresponding blocks described with reference to FIG. 4A or 4B. In this situation because the configuration data 402 does include estimator data, the estimator unit 412 may use the estimator data, the operating K-factor 404, and the load state 406 to determine the estimated operating parameter. In some implementations, the estimated operating parameter may be adjusted based on the reference voltage 408 or based on characteristics of the wireless power transmission apparatus.

Figure 19:
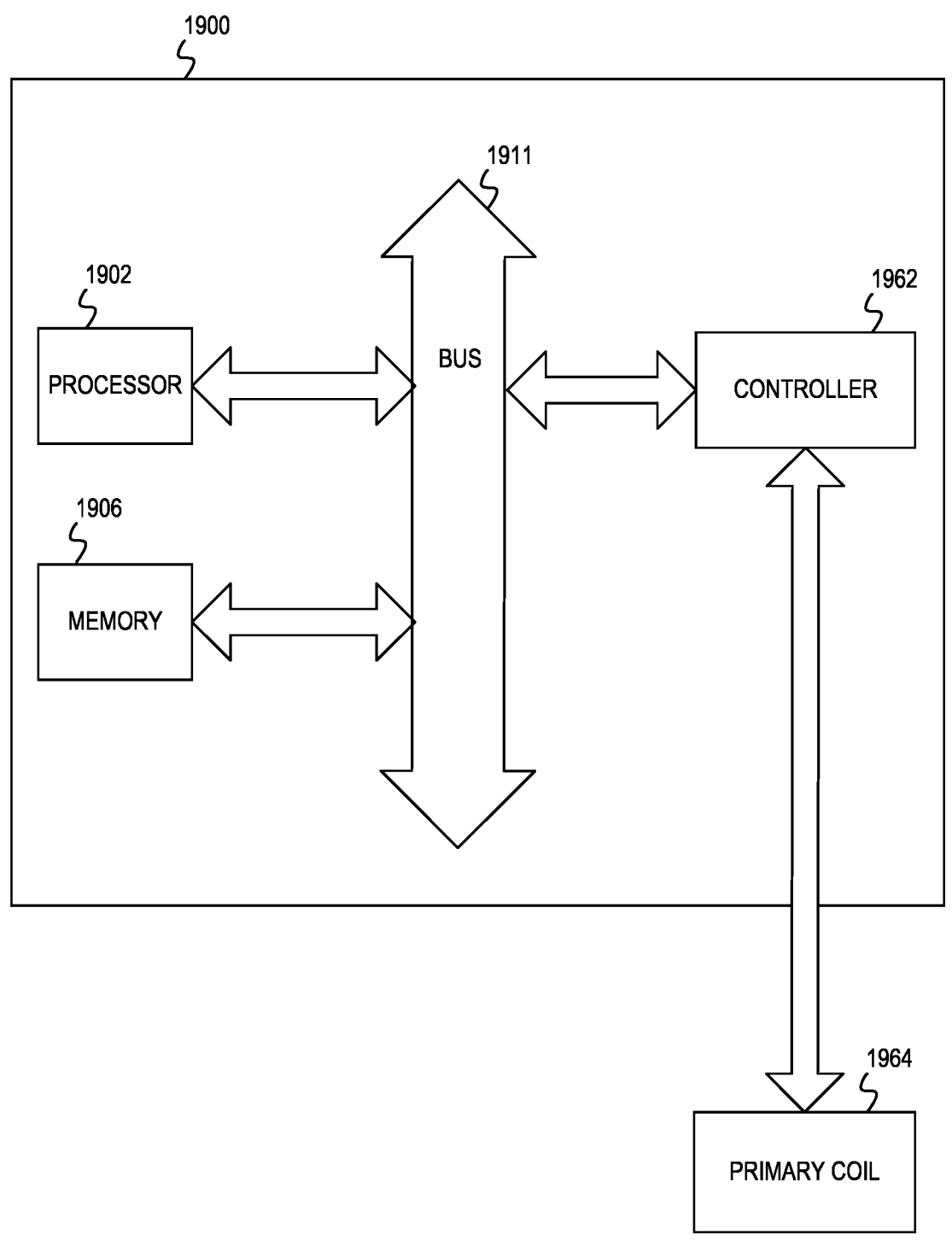
FIG. 19 shows a block diagram of an example apparatus for use in wireless power system.

FIG. 19 shows a block diagram of an example apparatus for use in wireless power system. In some implementations, the apparatus 1900 may be a wireless power transmission apparatus (such as the wireless power transmission apparatus 102) described herein. In some implementations, the apparatus 1900 may be an example of the TX controller 108 described with reference to FIG. 1, the wireless power transmission apparatus 300 described with reference to FIG. 3. The apparatus 1900 can include a processor 1902 (possibly including multiple processors, multiple cores, multiple nodes, or implementing multi-threading, etc.). The apparatus 1900 also can include a memory 1906. The memory 1906 may be system memory or any one or more of the possible realizations of computer-readable media described herein.

The apparatus 1900 also can include a bus 1911 (such as PCI, ISA, PCI-Express, HyperTransport®, InfiniBand®, NuBus® AHB, AXI, etc.).

The apparatus 1900 may include one or more controller(s) 1962 configured to manage multiple primary or secondary coils (such as a coil array 1964). In some implementations, the controller(s) 1962 can be distributed within the processor 1902, the memory 1906, and the bus 1911. The controller(s) 1962 may perform some or all of the operations described herein. For example, the controller(s) 1962 may be a transmission controller, such as the TX controller 108 described with reference to FIG. 1 or the TX controller 108 described with reference to FIG. 3.

The memory 1906 can include computer instructions executable by the processor 1902 to implement the functionality of the implementations described with reference to FIGS. 1-18. Any one of these functionalities may be partially (or entirely) implemented in hardware or on the processor 1902. For example, the functionality may be implemented with an application specific integrated circuit, in logic implemented in the processor 1902, in a co-processor on a peripheral device or card, etc. Further, realizations may include fewer or additional components not illustrated in FIG. 19. The processor 1902, the memory 1906, and the controller(s) 1962 may be coupled to the bus 1911. Although illustrated as being coupled to the bus 1911, the memory 1906 may be coupled to the processor 1902.

FIGS. 1-19 and the operations described herein are examples meant to aid in understanding example implementations and should not be used to limit the potential implementations or limit the scope of the claims. Some implementations may perform additional operations, fewer operations, operations in parallel or in a different order, and some operations differently The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

CLAUSES

Clause 1. A method performed by a wireless power transmission apparatus, including: obtaining configuration data, a load state, and a reference voltage associated with a variable load of a wireless power reception apparatus: initiating a transmission of wireless power to the wireless power reception apparatus using an operating control parameter that is based on the configuration data, the load state, and the reference voltage: receiving feedback information from the wireless power reception apparatus during the transmission of the wireless power, the feedback information including a load voltage measured by the wireless power reception apparatus and further indicating a change to the load state, the reference voltage, or both; and modifying the operating control parameter based on the feedback information.

Clause 2. The method of clause 1, further including, before initiating the transmission of the wireless power: determining an estimated operating parameter based on the configuration data, the load state, and the reference voltage; and determining the operating control parameter based on the estimated operating parameter.

Clause 3. The method of clause 2, where the configuration data includes a starting control parameter; and where the estimated operating parameter is based on the starting control parameter.

Clause 4. The method of clause 3, where the configuration data further includes a control parameter limit, and where determining the estimated operating parameter includes determining the estimated operating parameter such that the estimated operating parameter is at or above the control parameter limit.

Clause 5. The method of clause 4, where the starting control parameter includes a starting frequency (Fstart) and the control parameter limit includes a frequency limit (Flimit), and where the estimated operating parameter is an operating frequency based on the Fstart and the reference voltage, the operating frequency being at or above the Flimit.

Clause 6. The method of clause 2, where the configuration data includes one or more reference control parameters associated with one or more reference load states, and where the estimated operating parameter is based on a reference control parameter associated with a reference load state matching the load state.

Clause 7. The method of clause 2, where the configuration data includes a reference coupling factor (K-factor) for each combination one or more reference control parameters associated with one or more reference load states, and where determining the estimated operating parameter includes: determining an operating K-factor between the wireless power reception apparatus and the wireless power transmission apparatus: selecting a particular reference control parameter from the configuration data based on a particular reference load state matching the load state and a particular reference K-factor matching or approximating the operating K-factor: determining the estimated operating parameter based on the particular reference control parameter.

Clause 8. The method of clause 7, further including determining the estimated operating parameter based on an interpolation of two or more reference control parameters when the operating K-factor is between two or more corresponding reference K-factors.

Clause 9. The method of any one of clauses 7-8, where determining the operating K-factor includes: applying a first voltage to a primary coil of the wireless power transmission apparatus to induce a second voltage in a secondary coil of the wireless power reception apparatus when there is no current in the secondary coil: receiving, from the wireless power reception apparatus, a message indicating the second voltage induced in the secondary coil; and determining an operating K-factor based on a ratio of the second voltage and the first voltage.

Clause 10. The method of clause 9, where the configuration data further includes a number of receiver coil turns in the secondary coil, and where determining the operating K-factor further includes calculating the operating K-factor based on a multiplication of a first operand and a second operand, where the first operand is the second voltage divided by the number of receiver coil turns, and where the second operand is the number of transmitter coil turns in the primary coil divided by the first voltage.

Clause 11. The method of any one of clauses 2-10, where the estimated operating parameter includes an operating frequency.

Clause 12. The method of any one of clauses 2-11, further including, during the transmission of the wireless power: modifying the estimated operating parameter based the change to the load state, the reference voltage, or both; and modifying the operating control parameter based on the modified estimated operating control parameter and the reference voltage.

Clause 13. The method of any one of clauses 1-12, where receiving the feedback information includes: receiving one or more feedback messages from the wireless power reception apparatus during one or more corresponding feedback slots, each feedback message including at least a load state field indicating the load state and load voltage field indicating the load voltage measured by the wireless power reception apparatus.

Clause 14. The method of clause 13, where the one or more feedback messages include other data fields for indicating at least one member of a group consisting of the reference voltage associated with the load state of the variable load, a voltage measured at the secondary coil for determining an operating K-factor, a fault status, and an indication of a foreign object detected by the wireless power reception apparatus.

Clause 15. The method of clause 14, where the one or more feedback messages include a header field indicating a type of data populated in the other data fields.

Clause 16. The method of any one of clauses 13-15, where the one or more corresponding feedback slots occur at regular intervals during the transmission of the wireless power.

Clause 17. The method of clause 16, where the regular intervals are at zero-cross events corresponding to an alternating current (AC) mains voltage.

Clause 18. The method of any one of clauses 13-17, where the one or more feedback messages include a checksum field.

Clause 19. The method of any one of clauses 13-18, where the one or more feedback messages are each four bytes in length and are formatted with fixed bit lengths associated with each field.

Clause 20. The method of any one of clauses 1-19, further including: managing the transmission of the wireless power such that modifying the operating control parameter causes a change to the transmission of the wireless power to occur relative to a synchronization event when an alternating current (AC) mains voltage is equal to zero volts.

Clause 21. The method of any one of clauses 1-20, further including: receiving the configuration data in a first message via a communication coil of the wireless power transmission apparatus prior to the transmission of the wireless power via a primary coil of the wireless power transmission apparatus.

Clause 22. The method of any one of clauses 1-21, where the configuration data includes: a control indicator indicating a control type of the wireless power reception apparatus, an indication of a rated appliance voltage, an indication of a rated appliance power, an indication of a distance from a secondary coil of the wireless power reception apparatus and an interface surface of the wireless power reception apparatus, a number of receiver coil turns associated with the secondary coil, an indication of a free air inductance of the secondary coil, an indication of a resonance capacitance of the secondary coil, and an estimator data size field.

Clause 23. The method of clause 22, where the configuration data further includes: when the estimator data size field is equal to zero: a starting frequency (Fstart) and a frequency limit (Flimit), and when the estimator data size field is a non-zero value: a quantity of estimator data records based on the non-zero value, each estimator data record including a reference control parameter associated with a reference load states.

Clause 24. The method of clause 23, where the configuration data further includes: when the estimator data size field is the non-zero value: an indication of a reference wireless power transmission apparatus used to determine the quantity of estimator data records.

Clause 25. The method of any one of clauses 1-24, further including: determining that the feedback information includes a load state value indicating the load state is idle or off; and discontinuing the transmission of the wireless power.

Clause 26. A method performed by a wireless power reception apparatus, including: transmitting, to a wireless power transmission apparatus, configuration data, a load state, and a reference voltage associated with a variable load of the wireless power reception apparatus: receiving wireless power from the wireless power transmission apparatus that is based on the configuration data, the load state, and the reference voltage: transmitting feedback information to the wireless power transmission apparatus during reception of the wireless power, the feedback information including a load voltage measured by the wireless power reception apparatus and further indicating a change to the load state, the reference voltage, or both.

Clause 27. The method of clause 26, where the feedback information causes the wireless power transmission apparatus to modify an operating control parameter associated with the wireless power.

Clause 28. The method of clause 27, where the configuration data includes a starting control parameter, and where the wireless power is received having an operating frequency based on the starting control parameter.

Clause 29. The method of clause 28, where the configuration data further includes a control parameter limit, where the starting control parameter includes a starting frequency (Fstart) and the control parameter limit includes a frequency limit (Flimit), and where the estimated operating parameter is an operating frequency based on the Fstart and the reference voltage, the operating frequency being at or above the Flimit.

Clause 30. The method of clause 27, where the configuration data includes one or more reference control parameters associated with one or more reference load states, and where the wireless power is received using the operating control parameter based on a reference control parameter associated with a reference load state matching the load state.

Clause 31. The method of clause 27, where the configuration data includes a reference coupling factor (K-factor) for each combination of one or more reference control parameters associated with one or more reference load states, and where the wireless power is received having an operating control parameter based on an operating K-factor between the wireless power reception apparatus and the wireless power transmission apparatus associated with a particular reference coupling factor of configuration data.

Clause 32. The method of clause 31, further including: measuring a second voltage induced in a secondary coil of the wireless power reception apparatus based on a first voltage applied to a primary coil of the wireless power transmission apparatus when there is no current in the secondary coil: transmitting, to the wireless power transmission apparatus, a message indicating the second voltage measured in the secondary coil, where the operating K-factor is based on a ratio of the second voltage and the first voltage.

Clause 33. The method of clause 32, where the configuration data further includes a number of receiver coil turns in the secondary coil, and where the operating K-factor is based on based on a multiplication of a first operand and a second operand, where the first operand is the second voltage divided by the number of receiver coil turns, and where the second operand is the number of transmitter coil turns in the primary coil divided by the first voltage.

Clause 34. The method of any one of clauses 26-33, where transmitting the feedback information includes: transmitting one or more feedback messages to the wireless power transmission apparatus during one or more corresponding feedback slots, each feedback message including at least a load state field indicating the load state and load voltage field indicating the load voltage measured by the wireless power reception apparatus.

Clause 35. The method of clause 34, where the one or more feedback messages include other data fields for indicating at least one member of a group consisting of the reference voltage associated with the load state of the variable load, a voltage measured at the secondary coil for determining an operating K-factor, a fault status, and an indication of a foreign object detected by the wireless power reception apparatus.

Clause 36. The method of clause 35, where the one or more feedback messages include a header field indicating a type of data populated in the other data fields.

Clause 37. The method of any one of clauses 34-36, where the one or more corresponding feedback slots occur at regular intervals during the transmission of the wireless power.

Clause 38. The method of clause 37, where the regular intervals are at zero-cross events corresponding to an alternating current (AC) mains voltage.

Clause 39. The method of any one of clauses 34-38, where the one or more feedback messages include a checksum field.

Clause 40. The method of any one of clauses 34-39, where the one or more feedback messages are each four bytes in length and are formatted with fixed bit lengths associated with each field.

Clause 41. The method of any one of clauses 26-40, further including: managing the reception of the wireless power such that changes to the reception of the wireless power to occur relative to a synchronization event.

Clause 42. The method of any one of clauses 26-41, where the configuration data includes: a control indicator indicating a control type of the wireless power reception apparatus, an indication of a rated appliance voltage, an indication of a rated appliance power, an indication of a distance from a secondary coil of the wireless power reception apparatus and an interface surface of the wireless power reception apparatus, a number of receiver coil turns associated with the secondary coil, an indication of a free air inductance of the secondary coil, an indication of a resonance capacitance of the secondary coil, and an estimator data size field.

Clause 43. The method of clause 42, where the configuration data further includes: when the estimator data size field is equal to zero: a starting frequency (Fstart) and a frequency limit (Flimit), and when the estimator data size field is a non-zero value: a quantity of estimator data records based on the non-zero value, each estimator data record including a reference control parameter associated with a reference load state.

Clause 44. The method of clause 43, where the configuration data further includes: when the estimator data size field is the non-zero value: an indication of a reference wireless power transmission apparatus used to determine the quantity of estimator data records.

Clause 45. The method of any one of clauses 26-44, further including:

determining that the variable load is idle or off; and transmitting the feedback information with a load state value indicating the load state is idle or off to cause the wireless power transmission apparatus to discontinue transmission of the wireless power.

Clause 46. A wireless power transmission apparatus configured to perform any one of the methods of clauses 1-25.

Clause 47. A wireless power reception apparatus configured to perform any one of the methods of clauses 26-45.

Another innovative aspect of the subject matter described in this disclosure can be implemented as a computer-readable medium having stored therein instructions which, when executed by a processor, causes the processor to perform any one of the above-mentioned functionalities.

Another innovative aspect of the subject matter described in this disclosure can be implemented as a system having means for implementing any one of the above-mentioned functionalities.

Another innovative aspect of the subject matter described in this disclosure can be implemented as an apparatus having one or more processors configured to perform one or more operations from any one of the above-mentioned methods.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for dynamic power control by a wireless power transmission apparatus, comprising:
receiving, from a wireless power reception apparatus, configuration data in a single message prior to a power transfer phase, the configuration data including a plurality of reference control parameters for a plurality of corresponding reference load states of the wireless power reception apparatus, wherein each reference load state represents a different load voltage and load power setting of the wireless power reception apparatus;
receiving, from the wireless power reception apparatus, a load state of the wireless power reception apparatus, wherein the load state refers to a matching reference load state of the plurality of corresponding reference load states; and
transmitting wireless power to the wireless power reception apparatus using an operating control parameter that is based, at least in part, on the plurality of reference control parameters for the matching reference load state.

2. The method of claim 1, further comprising:
receiving, from the wireless power reception apparatus, information indicating a change to a different load state of the plurality of corresponding reference load states; and
modifying the operating control parameter based, at least in part, on the plurality of reference control parameters for a corresponding reference load state that matches the different load state.

3. The method of claim 2,
wherein the receiving the information indicating the change to the different load state occurs before the change; and
wherein the modifying the operating control parameter includes:
waiting until a synchronization event that corresponds to when the change will occur, and
modifying the operating control parameter for wireless power transmission at a time of the synchronization event in coordination with the change to the different load state.

4. The method of claim 1, further comprising, before the transmitting the wireless power:
determining an estimated operating parameter, the estimated operating parameter being an output of an estimator unit, wherein inputs to the estimator unit include at least the configuration data, the load state, and a reference voltage; and
determining the operating control parameter based on the estimated operating parameter combined with a feedback parameter.

5. The method of claim 4, wherein the configuration data includes a starting control parameter and a control parameter limit; and wherein the estimated operating parameter is based, at least in part, on the starting control parameter and the estimated operating parameter is at or above the control parameter limit.

6. The method of claim 4, wherein the configuration data includes a reference coupling factor (K-factor) for each combination of the plurality of reference control parameters associated with the plurality of reference load states, and wherein determining the estimated operating parameter includes:

determining an operating K-factor between the wireless power reception apparatus and the wireless power transmission apparatus;

selecting a particular reference control parameter from the configuration data based on a particular reference load state matching the load state and a particular reference K-factor matching or approximating the operating K-factor; and determining the estimated operating parameter based, at least in part, on the particular reference control parameter.

7. The method of claim 1, further comprising:

receiving one or more feedback messages from the wireless power reception apparatus during one or more corresponding feedback slots, wherein at least one feedback message includes a load state field indicating the load state and a data field indicating a load power.

8. The method of claim 7, wherein the at least one feedback message includes a header field and at least one other data field for indicating at least one member of a group consisting of a reference voltage associated with the load state of the load, a voltage measured at the secondary coil for determining an operating K-factor, a fault status, and an indication of a foreign object detected by the wireless power reception apparatus.

9. The method of claim 7, wherein the at least one feedback message includes a checksum field.

10. The method of claim 1, wherein the operating control parameter is further based on the configuration data and wherein the configuration data includes one or more fields indicating:

a control indicator indicating a control type of the wireless power reception apparatus, an indication of a rated appliance voltage, an indication of a rated appliance power, an indication of a distance from a secondary coil of the wireless power reception apparatus and an interface surface of the wireless power reception apparatus, a number of receiver coil turns associated with the secondary coil, an indication of a free air inductance of the secondary coil, an indication of a resonance capacitance of the secondary coil, or an estimator data size field.

11. A method for dynamic power control performed by a wireless power reception apparatus, comprising:

transmitting, to a wireless power transmission apparatus, configuration data plurality of corresponding reference load states in a single message prior to a power transfer phase, the configuration data including a plurality of reference control parameters for a plurality of corresponding reference load states of the wireless power reception apparatus, wherein each reference load state represents a different load voltage and load power setting of the wireless power reception apparatus;

transmitting, to the wireless power transmission apparatus, a load state of the wireless power reception apparatus, wherein the load state refers to a matching reference load state of the plurality of corresponding reference load states; and receiving wireless power from the wireless power transmission apparatus that is based, at least in part, on the plurality of reference control parameters for the matching reference load state.

12. The method of claim 11, further comprising:

transmitting, to the wireless power transmission apparatus, information indicating a change to a different load state of the plurality of corresponding reference load states during reception of the wireless power, wherein the information causes the wireless power transmission apparatus to modify an operating control parameter associated with the wireless power.

13. The method of claim 12, further comprising:

making the change to the different load state at a time of a synchronization event that synchronizes the change to the different load state with a change to the wireless power.

14. The method of claim 11, further comprising: transmitting one or more feedback messages to the wireless power transmission apparatus during one or more corresponding feedback slots, wherein at least one feedback message includes a load state field indicating the load state and a data field indicating a load power.

15. The method of claim 11, wherein an operating control parameter is further based on the configuration data and wherein the configuration data includes one or more fields indicating:

a control indicator indicating a control type of the wireless power reception apparatus, an indication of a rated appliance voltage, an indication of a rated appliance power, an indication of a distance from a secondary coil of the wireless power reception apparatus and an interface surface of the wireless power reception apparatus, a number of receiver coil turns associated with the secondary coil, an indication of a free air inductance of the secondary coil, an indication of a resonance capacitance of the secondary coil, or an estimator data size field.

16. The method of claim 11, further comprising:

determining that the load is idle or off; and transmitting feedback information with a load state value indicating the load state is idle or off to cause the wireless power transmission apparatus to discontinue transmission of the wireless power.

17. A wireless power transmission apparatus, comprising:

a communication unit to:

receive, from a wireless power reception apparatus, configuration data in a single message prior to a power transfer phase, the configuration data including a plurality of more reference control parameters for a plurality of corresponding reference load states of the wireless power reception apparatus, wherein each reference load state represents a different load voltage and load power setting of the wireless power reception apparatus, and receive, from the wireless power reception apparatus, a load state of the wireless power reception apparatus, wherein the load state refers to a matching reference load state of the plurality of corresponding reference load states;

a primary coil to transmit wireless power to the wireless power reception apparatus using an operating control parameter; and a controller to control the operating control parameter based, at least in part, on the plurality of reference control parameters for the matching reference load state.

18. The wireless power transmission apparatus of claim 17, further comprising:

the communication unit to receive, from the wireless power reception apparatus, information indicating a change to a different load state of the plurality of corresponding reference load states; and the controller to modify the operating control parameter based, at least in part, on the plurality of reference control parameters for a corresponding reference load state that matches the different load state.

19. The wireless power transmission apparatus of claim 18, wherein the controller changes the operating control parameter at a time of a synchronization event that synchronizes the modifying with the change to the different load state.

* * * * *